(12) United States Patent
Ueda et al.

(10) Patent No.: US 8,937,113 B2
(45) Date of Patent: Jan. 20, 2015

(54) VINYL CHLORIDE RESIN AGGREGATE PARTICLE, METHOD FOR PRODUCING SAME, AND GLOVES COMPRISING SAME

(75) Inventors: Takashi Ueda, Hyogo (JP); Fumihiro Mitamura, Hyogo (JP); Hiroshi Saito, Hyogo (JP); Morio Ishihara, Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 14/122,948

(22) PCT Filed: Mar. 29, 2012

(86) PCT No.: PCT/JP2012/058381
§ 371 (c)(1),
(2), (4) Date: Nov. 27, 2013

(87) PCT Pub. No.: WO2012/165021
PCT Pub. Date: Dec. 6, 2012

(65) Prior Publication Data
US 2014/0088222 A1 Mar. 27, 2014

(30) Foreign Application Priority Data

May 31, 2011 (JP) .................................. 2011-121621
Feb. 3, 2012 (JP) .................................. 2012-021527

(51) Int. Cl.
| | | |
|---|---|---|
| *C08C 1/14* | (2006.01) |
| *A41D 31/00* | (2006.01) |
| *C08F 6/22* | (2006.01) |
| *C08F 14/06* | (2006.01) |
| *C08F 6/00* | (2006.01) |
| *A41D 19/00* | (2006.01) |
| *C08J 5/02* | (2006.01) |

(52) U.S. Cl.
CPC . *A41D 31/00* (2013.01); *C08F 6/22* (2013.01); *C08F 14/06* (2013.01); *C08F 6/001* (2013.01); *A41D 19/00* (2013.01); *C08J 5/02* (2013.01)
USPC ............................ 523/352; 524/314; 524/394

(58) Field of Classification Search
CPC .............. C08J 3/16; C08F 6/22; C08F 14/06; C08F 114/06
USPC .................... 523/352; 524/314, 394
See application file for complete search history.

(56) References Cited

U.S. PATENT DOCUMENTS

| 6,150,484 A | 11/2000 | Kobayashi et al. |
| 6,337,378 B1 | 1/2002 | Kobayashi et al. |
| 2013/0167287 A1 | 7/2013 | Ueda et al. |

FOREIGN PATENT DOCUMENTS

| JP | 46-007177 | 2/1971 |
| JP | 48-016945 | 3/1973 |
| JP | 48-016946 | 3/1973 |
| JP | 58-145748 | 8/1983 |
| JP | 6-200105 | 7/1994 |
| JP | 7-138314 | 5/1995 |
| JP | 8-302128 | 11/1996 |
| JP | 9-286815 | 11/1997 |
| JP | 10-251339 | 9/1998 |
| JP | 2009-227699 | 10/2009 |
| WO | 2008/041697 | 4/2008 |
| WO | 2012/035830 | 3/2012 |

OTHER PUBLICATIONS

U.S. Appl. No. 13/823,609.*
Cavalier, et al., "Effects of water on the rheological properties of calcite suspensions in dioctylphthalate", Colloids and Surfaces, A: Physicochemical and Engineering Aspects, 2002, vol. 197, pp. 173-181.
Kayano, et al., "Nanorheology of Dioctyl Phthalate Confined between Surfaces Coated with Long Alkyl Chains", Langmuir, 2007, vol. 23, pp. 8365-8370.

* cited by examiner

*Primary Examiner* — Edward Cain
(74) *Attorney, Agent, or Firm* — Hamre, Schumann, Mueller & Larson, P.C.

(57) ABSTRACT

The present invention provides vinyl chloride-based resin aggregate particles capable of providing a plastisol with excellent non-infiltrating property and favorable sagging property, a method for producing the same, and a glove using the same. The vinyl chloride-based resin aggregate particles of the present invention have a mean volume particle diameter of 10 to 60 μm, and the percentage of particles having a particle diameter of 10 to 60 μm is at least 50 vol %. The moisture absorption coefficient is 1.5 wt % or less when being retained for 24 hours under conditions of 30° C. and a relative humidity of 97.0±0.4%. A plastisol comprising 100 weight parts of the vinyl chloride-based resin aggregate particles and 160 weight parts of di-2-ethylhexyl phthalate satisfies a relationship of $3 \leq \eta 70/\eta 40 \leq 1000$. Further, in the vinyl chloride-based resin aggregate particles of the present invention, the number of voids having a void size of 1.0 μm or more per one aggregate particle is less than 5.0, and the percentage of particles having a particle diameter of 1.0 μm or less after ultrasonic treatment is less than 3.0 vol %.

20 Claims, 5 Drawing Sheets

VINYL CHLORIDE RESIN AGGREGATE PARTICLE, METHOD FOR PRODUCING SAME, AND GLOVES COMPRISING SAME

TECHNICAL FIELD

The present invention relates to vinyl chloride-based resin aggregate particles, a method for producing the same, and a glove using the same.

BACKGROUND ART

Sheets, gloves, bags and the like coated with a vinyl chloride-based resin have great mechanical strength, and they exhibit excellent wear resistance, chemical resistance and oil resistance so that they can be used in various fields such as fishery, agriculture, mining and the like.

Conventionally, coating of the vinyl chloride-based resin on sheets, gloves, bags and the like has been performed by spraying or dipping of a plastisol containing vinyl chloride-based resin aggregate particles or a gelled melt prepared by heating the plastisol on a fabric.

Since a plastisol is a viscous liquid, when it is applied to a fabric or used for dipping, the plastisol may infiltrate into the fabric, sometimes into the back face of the fabric. Similarly, in a case of heating the plastisol, the gelled melt may infiltrate into the back face of the fabric. If the plastisol or the gelled melt infiltrates into the back face of the fabric, the flexibility of the coated product will deteriorate considerably, which harms the product functions. In particular, when it is applied to gloves, even if the infiltration is local, the obtained gloves will cause discomfort in wearing to the user, and degrade the commercial value.

For coping with such problems, there have been proposed vinyl chloride-based resins capable of lowering a property of plastisol of infiltrating into the fabric back face at the time of being coated on the fabric, i.e., capable of providing a plastisol with improved non-infiltrating property, and a method for producing the same. For example, Patent Document 1 proposes a method for heat-treating a vinyl chloride resin for paste in hot air at 60 to 140° C. for 5 minutes to 1 hour. Patent Document 2 proposes a vinyl chloride resin having a mean particle diameter of 20 to 50 μm that has been dried by a spray drier, with the outlet temperature set at 65° C. or higher. Patent Document 3 proposes a vinyl chloride resin having a specific particle size distribution, a certain level of resistance to disintegration strength, and a specific void volume. Patent Document 4 proposes a method for adding an infiltration suppressant, such as a copolymer of methyl vinyl ether and maleic anhydride, to a vinyl chloride resin latex and drying the mixture. Patent Document 5 proposes a method for drying a vinyl chloride resin latex that has been coagulated using a specific coagulant composed of a water-soluble polymer and an inorganic salt. Patent Document 6 proposes a method for using a vinyl chloride resin latex that has been polymerized using a specific acrylic monomer.

However, regarding plastisols containing the vinyl chloride-based resins proposed in the above-mentioned Patent Documents 1 to 6, although the non-infiltrating property is improved, the sagging property tends to be inferior to plastisols containing general-purpose vinyl chloride resin paste. If the sagging property of the plastisol is insufficient, when the plastisol is applied on a fabric glove or the like that has been mounted on a mold of a hand shape and excessive plastisol is to sag off from the product, the plastisol will adhere excessively to the fabric glove or the like. Such a glove on which plastisol adheres too much will be heavy and less flexible, and thus less comfortable in use.

Further, for the plastisol containing the vinyl chloride-based resin, an increase in viscosity over time (thickening over time) has been a technical problem for many years. For example, as disclosed in Non-Patent Documents 1 and 2, a phenomenon has been known that when di-2-ethylhexyl phthalate (general plasticizer) is used, the viscosity of sol increases significantly even with a slight change in the moisture content, such as due to absorption of moisture in air by the plasticizer. Such thickening over time of the sol decreases the sagging property of the plastisol.

PRIOR ART DOCUMENTS

Patent Documents

Patent Document 1: JP 1971(46)-7177 B
Patent Document 2: JP 1973(48)-16945 A
Patent Document 3: JP 1983(58)-145748 A
Patent Document 4: JP 1973(48)-16946 A
Patent Document 5: WO 2008/041697 A
Patent Document 6: JP 2009-227699 A

Non-Patent Documents

Non-Patent Document 1: Colloids and Surfaces A: Physicochemical and Engineering Aspects, 2002, vol. 197, pages 173-181
Non-Patent Document 2: Langmuir, 2007, vol. 23, pages 8365-8370

DISCLOSURE OF INVENTION

Problem to be Solved by the Invention

In order to solve the above-mentioned conventional problems, the present invention provides vinyl chloride-based resin aggregate particles capable of providing a plastisol with excellent non-infiltrating property and favorable sagging property, a method for producing the same, and a glove using the same.

Means for Solving Problem

Vinyl chloride-based resin aggregate particles of the present invention are characterized as follows. The vinyl chloride-based resin aggregate particles have a mean volume particle diameter of 10 to 60 μm, and the percentage of particles having a particle diameter of 10 to 60 μm is at least 50% by volume. A moisture absorption coefficient of the vinyl chloride-based resin aggregate particles is 1.5% by weight or less when being retained for 24 hours under conditions of 30° C. and a relative humidity of 97.0±0.4%. A plastisol comprising 100 parts by weight of the vinyl chloride-based resin aggregate particles and 160 parts by weight of di-2-ethylhexyl phthalate satisfies a relationship of $3 \leq \eta 70/\eta 40 \leq 100$ where $\eta 40$ is a viscosity at a shear rate of $1 \text{ s}^{-1}$ of a plastisol retained at 40° C. for 10 minutes and $\eta 70$ is a viscosity at a shear rate of $1 \text{ s}^{-1}$ of a plastisol that has been warmed from 40° C. at 10° C./min. and retained at 70° C. for 3 minutes.

Vinyl chloride-based resin aggregate particles of the present invention are characterized as follows. The vinyl chloride-based resin aggregate particles have a mean volume particle diameter of 10 to 60 μm, and the percentage of particles having a particle diameter of 10 to 60 μm is at least 50% by volume. An apparent density of the vinyl chloride-based resin aggregate particles is in a range of 0.21 to 0.34 g/ml. The number of voids having a void size of 1.0 μm or more per one aggregate particle in the vinyl chloride-based resin aggregate particles is less than 5.0. Further, when the vinyl chloride-based resin aggregate particles are subjected to an ultrasonic treatment that is irradiation with 28-kHz ultrasonic waves at 25° C. for 12 minutes, the percentage of particles having a particle diameter of 1.0 μm or less after the ultrasonic treatment is less than 3.0% by volume.

The production method of the present invention is a method for producing vinyl chloride-based resin aggregate particles of the present invention. The method includes: adding for coagulation a coagulant that contains 50% by weight or more of an inorganic acid to a vinyl chloride-based resin latex so as to form a coagulated latex of vinyl chloride-based resin that contains a polymer solid at a concentration of 22% by weight or more; heat-treating the coagulated latex of vinyl chloride-based resin at a temperature ranging from Tg or higher to Tg+35° C. or lower so as to form a slurry containing vinyl chloride-based resin aggregate particles, where Tg is a glass transition temperature of the vinyl chloride-based resin; adjusting a pH of the slurry containing vinyl chloride-based resin aggregate particles in a range of 4 to 11; and dewatering and drying the slurry containing vinyl chloride-based resin aggregate particles after the pH adjustment, followed by pulverization and/or classification, thereby obtaining vinyl chloride-based resin aggregate particles that have a mean volume particle diameter of 10 to 60 μm and whose percentage of particles having a particle diameter of 10 to 60 μm is at least 50% by volume.

The following are preferable in the method for producing vinyl chloride-based resin aggregate particles of the present invention. The heat treatment is performed by mixing the coagulated latex of vinyl chloride-based resin with at least one heating medium selected from the group consisting of water vapor and water bath. The vinyl chloride-based resin is a vinyl chloride resin. The heat treatment is performed at a temperature of 80 to 115° C. A temperature at the time of adding for coagulation the coagulant to the vinyl chloride-based resin latex is in a range of 5° C. or higher to Tg−15° C. or lower. The coagulated latex of vinyl chloride-based resin contains a polymer solid at a concentration of 25 to 50% by weight. The vinyl chloride-based resin latex is obtained by adding for polymerization a polymerization initiator and an emulsifier to a vinyl chloride monomer or a mixture of a vinyl chloride monomer and a monomer that is co-polymerizable with the vinyl chloride monomer, and the emulsifier is a fatty acid salt. Further, the coagulant is composed of an inorganic acid only. Further, the inorganic acid is at least one selected from the group consisting of sulfuric acid and hydrochloric acid.

A glove of the present invention is a glove coated with a vinyl chloride-based resin, wherein the glove is coated with the vinyl chloride-based resin by applying a plastisol on the fabric surface of the glove and subsequently heating for gelation, and the plastisol contains the vinyl chloride-based resin aggregate particles of the present invention.

Effects of the Invention

According to the present invention, it is possible to obtain vinyl chloride-based resin aggregate particles capable of providing a plastisol with excellent non-infiltrating property. Further, a plastisol containing the vinyl chloride-based resin aggregate particles of the present invention has little increase in viscosity due to warm-up, little increase in viscosity over time when a moisture content of plastisol becomes high due to moisture absorption, etc., (including the case of adding moisture), and has excellent sagging property. Further, according to the present invention, it is possible to obtain a glove coated with a vinyl chloride-based resin that is favorable in fit, flexible and comfort in use.

DESCRIPTION OF THE INVENTION

Figure 1:
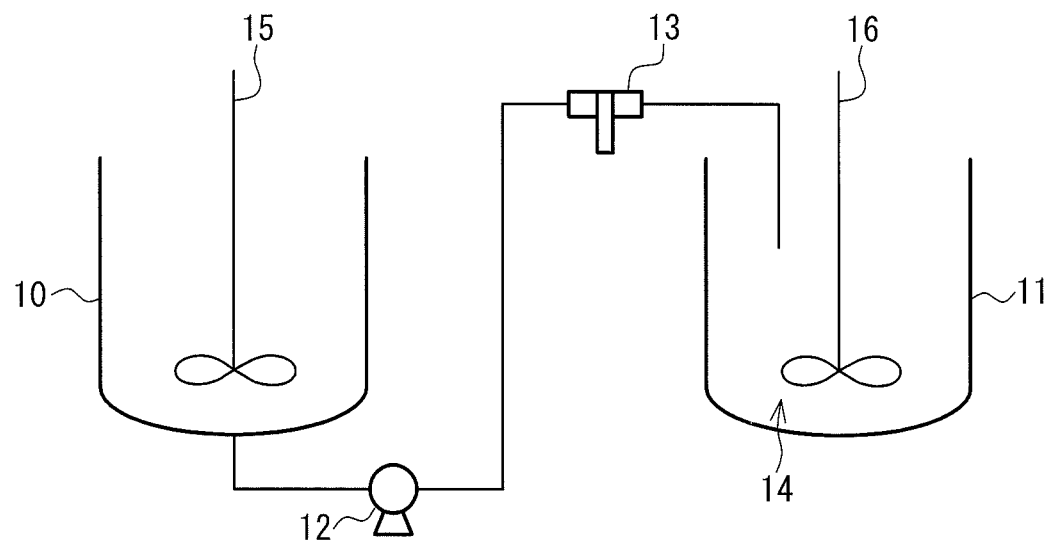
FIG. 1 is a schematic view illustrating an exemplary step of producing vinyl chloride-based resin aggregate particles.

The vinyl chloride-based resin aggregate particles of the present invention can suppress, by being added to a plastisol, the infiltration of plastisol into a back face of a fabric that may occur in the case of applying a plastisol to a fabric surface. In the present specification, "fabric" denotes a sheet-like material made of fibers such as a woven fabric, a knitted fabric, a non-woven fabric or the like. Further, in the present specification, "non-infiltrating property" indicates that when a plastisol is applied on a fabric surface, infiltration into the fabric back face can be suppressed. Further, in the present specification, "application" indicates an operation of adhering the plastisol onto the fabric surface through operations such as painting, sprinkling, dipping and the like.

(Vinyl Chloride-Based Resin Aggregate Particles)

Hereinafter, first, vinyl chloride-based resin aggregate particles of Embodiment 1 will be described.

Embodiment 1

In Embodiment 1, vinyl chloride-based resin aggregate particles of the present invention have a mean volume particle diameter of 10 to 60 μm, and the percentage of particles having a particle diameter of 10 to 60 μm is at least 50 vol %. It is preferable that the mean volume particle diameter is in a range of 10 to 60 μm from the viewpoint of suppressing an increase in viscosity of the plastisol and also suppressing precipitation of the vinyl chloride-based resin aggregate particles in the plastisol over time. Furthermore, when the percentage of particles having a particle diameter of 10 to 60 μm is at least 50 vol % of the vinyl chloride-based resin aggregate particles, the non-infiltrating property of the plastisol containing the vinyl chloride-based resin aggregate particles is improved, the glove weight is reduced and the texture becomes favorable. From the viewpoint of non-infiltrating property, it is more preferable that the mean volume particle diameter of the vinyl chloride-based resin aggregate particles is 10 to 50 μm. Moreover, from the viewpoint of non-infiltrating property, it is more preferable that the percentage of particles having a particle diameter of 10 to 60 μm is at least 60 vol % of the vinyl chloride-based resin aggregate particles. In the present invention, a mean volume particle diameter denotes the average diameter calculated from the particle size distribution on a volumetric basis. Here, the particle size distribution of the particles can be measured using MICROTRACK HRA9320-X-100 model (manufactured by Nikkiso Co., Ltd.), which is a laser diffraction particle size analyzer.

A moisture absorption coefficient of the above-mentioned vinyl chloride-based resin aggregate particles is 1.5 wt % or less when they are retained for 24 hours under conditions of 30° C. and a relative humidity of 97.0±0.4% (tested by a desiccator method using a saturated aqueous solution of potassium sulfate) in accordance with an operation procedure of JIS A 1475 (hereinafter, also referred to as a moisture absorption coefficient, simply). If the moisture absorption coefficient is 1.5 wt % or less, an increase in viscosity due to moisture absorption of plastisol (thickening due to moisture absorption) is less likely to occur at the time of producing or storing the plastisol containing the vinyl chloride-based resin aggregate particles. A sagging property of the plastisol relies on the viscosity. As the viscosity of the plastisol increases, the sagging property of the plastisol decreases. If such a plastisol is applied on a glove, the glove will be heavy, thick and inflexible. Further, from the viewpoint of sagging property, the moisture absorption coefficient of the vinyl chloride-based resin aggregate particles is more preferably 1.0 wt % or less, and further preferably 0.75 wt % or less. When the moisture absorption coefficient is within this range, the thickening due to moisture absorption of the plastisol containing the vinyl chloride-based resin aggregate particles is less likely to occur, which makes it possible to provide the plastisol having favorable non-infiltrating property and sagging property even under a condition of high temperature and high humidity. By coating a glove with such a plastisol, a light and flexible glove can be obtained.

Further, it is preferable for the plastisol containing the above-mentioned vinyl chloride-based resin aggregate particles that the viscosity is changed less by the temperature rise from the viewpoint of sagging property. As mentioned above, the sagging property of a plastisol relies on the viscosity. Further, the viscosity of a plastisol is affected easily by temperature. In particular, when a plastisol containing vinyl chloride-based resin is heated from room temperature to a temperature close to the glass transition temperature of the vinyl chloride-based resin, in general the viscosity of the plastisol tends to increase gradually as gelation proceeds. As a result, at the time of applying the plastisol on the glove of fabric, the sagging property of the plastisol may change considerably if the viscosity changes greatly depending on the temperature of the mold for mounting the glove.

In a case where $\eta 40$ denotes a viscosity at a shear rate of 1 $s^{-1}$ of the plastisol retained at 40° C. for 10 minutes and $\eta 70$ denotes a viscosity at a share rate of 1 $s^{-1}$ of the plastisol that has been warmed from 40° C. at 10° C./min. and retained at 70° C. for 3 minutes, the viscosity change caused by the temperature rise can be evaluated by $\eta 70/\eta 40$ (hereinafter, it is recited also as heat thickening degree). Further, the evaluation of the $\eta 70/\eta 40$ (heat thickening degree) is performed by using a plastisol containing 100 weight parts of the above-mentioned vinyl chloride-based resin aggregate particles and 160 weight parts of di-2-ethylhexyl phthalate. For the measurement, in a case of using a plastisol that has been prepared or stored at room temperature, preferably the plastisol is heated from the room temperature to 40° C. and subsequently retained at 40° C. for 10 minutes before warming to 70° C. Further, the viscosity here can be measured in a simple manner using a commercially available rheometer having a function of temperature control, and an example thereof is AR2000 manufactured by TA Instruments.

In the present invention, when the $\eta 70/\eta 40$ of the plastisol containing the above-mentioned vinyl chloride-based resin aggregate particles is in the range of 3 to 1000, the viscosity is increased less due to the warm-up of the plastisol and the sagging property is excellent. From the viewpoint of excellent sagging property and non-infiltrating property, the $\eta 70/\eta 40$ is preferably 5 to 110. When the $\eta 70/\eta 40$ (heat thickening degree) is 3 or higher, the plastisol exhibits favorable sagging property. Furthermore, the vinyl chloride-based resin aggregate particles will not disintegrate at the time of preparing the plastisol, the percentage of particles having a particle diameter of 10 to 60 μm will be at least 50 vol % easily, and thus the non-infiltrating property will be improved. Furthermore, when the $\eta 70/\eta 40$ (heat thickening degree) is 1000 or lower, the non-infiltrating property of the plastisol is favorable. Moreover, the plastisol will experience less heat thickening even in a particularly high-temperature condition, and the sagging property is improved.

The above-mentioned $\eta 70/\eta 40$ (heat thickening degree) changes depending on the conditions for forming the aggregate particles, for example, the type and amount of the coagulant, the concentration of the polymer solid in the coagulated latex, the type of the heating medium, heat treatment temperature, heat treatment time and the like. In the present invention, the temperature and time for heat treatment are adjusted appropriately in a condition where the type and amount of the coagulant, the concentration of the polymer solid in the coagulated latex, and the type of the heating medium are preset respectively, thereby obtaining vinyl chloride-based resin aggregate particles having $\eta 70/\eta 40$ (heat thickening degree) in a range of 3 to 1000.

An apparent density of the vinyl chloride-based resin aggregate particles is preferably in a range of 0.21 to 0.34 g/ml, and more preferably in a range of 0.21 to 0.31 g/ml. When the apparent density of the vinyl chloride-based resin aggregate particles is within this range, the non-infiltrating property of the plastisol containing the vinyl chloride-based resin aggregate particles becomes favorable, which makes it possible to obtain a light and flexible glove. The apparent density of the vinyl chloride-based resin aggregate particles can be measured using Powder Tester PT-R (manufactured by Hosokawa Micron Group) in accordance with JIS K 7365.

Next, vinyl chloride-based resin aggregate particles of Embodiment 2 will be described.

Embodiment 2

In Embodiment 2, vinyl chloride-based resin aggregate particles of the present invention have a mean volume particle diameter of 10 to 60 μm, and the percentage of particles having a particle diameter of 10 to 60 μm is at least 50 vol %. It is preferable that the mean volume particle diameter is in a range of 10 to 60 μm from the viewpoint of suppressing an increase in viscosity of plastisol and also suppressing precipitation of the vinyl chloride-based resin aggregate particles in the plastisol over time. Furthermore, when the percentage of particles having a particle diameter of 10 to 60 µm is at least 50 vol % in the vinyl chloride-based resin aggregate particles, the non-infiltrating property of the plastisol containing the vinyl chloride-based resin aggregate particles is improved, the glove weight is reduced and the texture becomes favorable. From the viewpoint of non-infiltrating property, it is more preferable that the mean volume particle diameter of the vinyl chloride-based resin aggregate particles is 10 to 50 µm. Moreover, from the viewpoint of non-infiltrating property, it is more preferable that the percentage of particles having a particle diameter of 10 to 60 µm is at least 60 vol % in the vinyl chloride-based resin aggregate particles. In the present invention, a mean volume particle diameter denotes the average diameter calculated from the particle size distribution on a volumetric basis. Here, the particle size distribution of the particles can be measured using MICROTRACK HRA9320-X-100 model (manufactured by Nikkiso Co., Ltd.), which is a laser diffraction particle size analyzer.

The apparent density of the vinyl chloride-based resin aggregate particles is in a range of 0.21 to 0.34 g/ml, and preferably in a range of 0.21 to 0.31 g/ml. When the apparent density of the vinyl chloride-based resin aggregate particles is in the range of 0.21 to 0.34 g/ml, the non-infiltrating property of the plastisol containing the vinyl chloride-based resin aggregate particles becomes favorable, and hence a light and flexible glove can be obtained. Similarly to the case of Embodiment 1, the apparent density of the vinyl chloride-based resin aggregate particles can be measured in accordance with JIS K 7365 using Powder Tester PT-R (manufactured by Hosokawa Micron Group).

Regarding the above-mentioned vinyl chloride-based resin aggregate particles, the number of voids having a void size of 1.0 µm or more per one aggregate particle is less than 5.0. When the number of voids having a void size of 1.0 µm or more per one aggregate particle is 5.0 or more, there is a tendency that not both of the non-infiltrating property and sagging property of the plastisol containing the vinyl chloride-based resin aggregate particles can be kept at a high level. If such a plastisol is applied on a glove, either or both of the non-infiltrating property and sagging property tend to decrease. Further, when the number of voids having a void size of 1.0 µm or more per one aggregate particle is 5.0 or more, there is a high tendency for the viscosity of the plastisol to increase over time at the time of storing the plastisol containing the vinyl chloride-based resin aggregate particles for more than several days, which decreases a handling property. From the viewpoint of further improving the non-infiltrating property and sagging property of the plastisol containing the vinyl chloride-based resin aggregate particles, the number of voids having a void size of 1.0 µm or more per one aggregate particle in the vinyl chloride-based resin aggregate particles is preferably 4.0 or less, more preferably 3.6 or less, further preferably 3.0 or less, further more preferably 1.0 or less, and particularly preferably 0.

Figure 3:
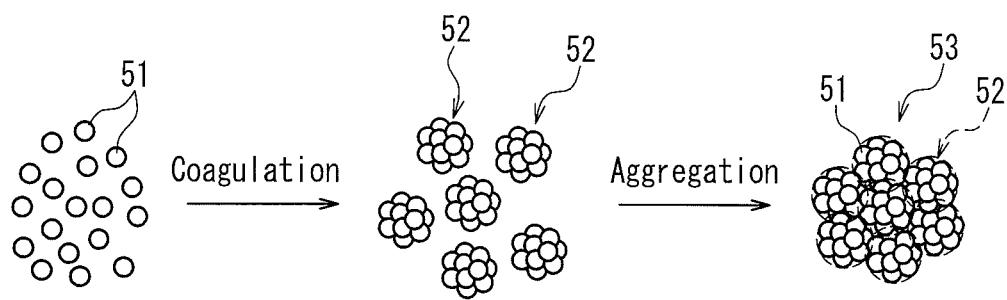
FIG. 3 is a schematic view illustrating a hierarchical structure in vinyl chloride-based resin aggregate particles.

As shown in FIG. 3, the above-mentioned vinyl chloride-based resin aggregate particles are obtained as follows. Coagulated latex particles of vinyl chloride-based resin 52 (primary aggregate particles) that are obtained by coagulating vinyl chloride-based resin latex particles 51 (corresponding to base particles) using a coagulant are aggregated so as to form vinyl chloride-based resin aggregate particles 53 (secondary aggregate particles) having a cluster structure. The size of voids in the vinyl chloride-based resin aggregate particles 53 having such a cluster structure is based on the size of the primary aggregate particles 52 forming the cluster structure. Particularly when the mean diameter of the major diameter and the minor diameter of the primary aggregate particles is larger than 1.0 µm, voids having a void size of 1.0 µm or more are prone to be formed. Incidentally, in the primary aggregate particles, "the mean diameter of the major diameter and the minor diameter" is a value obtained by dividing the sum of the major diameter and the minor diameter by 2, and called generally as a major-minor mean diameter. The formula is: major-minor mean diameter=(major diameter+minor diameter)/2.

The size of the primary aggregate particles is affected easily by the type of the coagulant, the type of an emulsifier in the case of producing a vinyl chloride-based resin latex by an emulsion polymerization, etc. When using an inorganic acid as the coagulant, it is possible to prepare vinyl chloride-based resin aggregate particles with very few voids having a void size of 1.0 µm or more, which is preferable. More preferably, when using the inorganic acid as the coagulant and using a fatty acid salt as the emulsifier, such as potassium salts of fatty acids, sodium salts of fatty acids and ammonium salts of fatty acids, it is possible to prepare vinyl chloride-based resin aggregate particles without voids having a void size of 1.0 µm or more.

Figure 4:
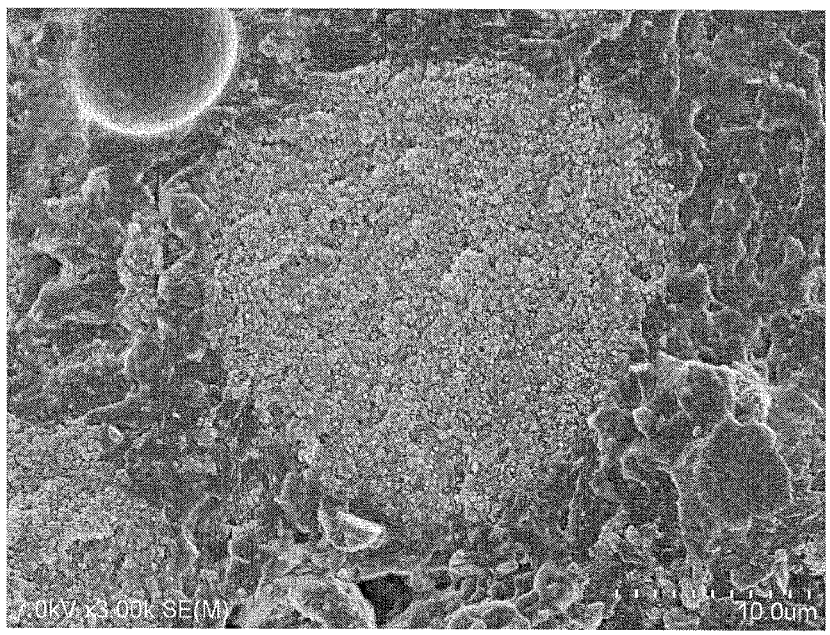
FIG. 4 is a photograph (3000× magnification) of a scanning electron microscope showing a fractured surface of a vinyl chloride-based resin aggregate particle in one Example of the present invention.
Figure 5:
FIG. 5 is a photograph (3000× magnification) of a scanning electron microscope showing a fractured surface of a vinyl chloride-based resin aggregate particle in one Comparative Example of the present invention.
Figure 6:
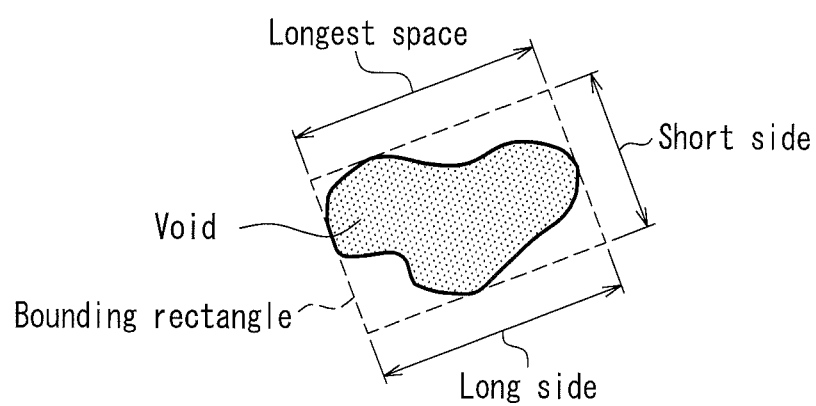
FIG. 6 is a schematic view showing an exemplary void.

In the present invention, the size of voids in the vinyl chloride-based resin aggregate particles can be measured by observing fractured surfaces of vinyl chloride-based resin aggregate particles using a scanning electron microscope. FIGS. 4 and 5 are photographs (3000× magnification) of the scanning electron microscope respectively showing fractured surfaces of vinyl chloride-based resin aggregate particles in one Example and one Comparative Example of the present invention. As can be seen from FIGS. 4 and 5, there is almost no void in the vinyl chloride-based resin aggregate particle of the present invention, whereas micron-size voids are present in the vinyl chloride-based resin aggregate particle of the Comparative Example. Generally, the shape of voids present in the vinyl chloride-based resin aggregate particles is random. Therefore, as shown in FIG. 6, the void size in the present invention indicates the major diameter of the void, i.e., a length on a long side (major diameter) of a rectangle that bounds the void (bounding rectangle). The measurement of the void size in the vinyl chloride-based resin aggregate particles can be performed specifically in the following manner. 0.2 g of the vinyl chloride-based resin aggregate particles is added to 1.0 g of an epoxy adhesive, and the whole is mixed uniformly, thereby preparing a mixed solution. The obtained mixed solution is filled in a gelatin capsule and left for 24 hours at room temperature (20±5° C.) so as to harden the epoxy adhesive, thereby forming a hardened mixture. The obtained hardened mixture is taken out from the gelatin capsule and dipped in liquid nitrogen for 15 minutes for freezing. A cutter edge is placed on the frozen hardened mixture and hit with a wooden hammer from above to fracture the hardened mixture. Thus, fractured surfaces are formed. Next, platinum-palladium is vapor-deposited on the fractured surfaces of the vinyl chloride-based resin aggregate particles, and observed using a scanning electron microscope ("S-4800" manufactured by Hitachi High-Technologies Corporation, 3000× magnification). The number of voids having a void size of 1.0 µm or more in 10 fractured surfaces of the vinyl chloride-based resin aggregate particles selected at random is counted and averaged, and the value averaged is defined as the number of voids having a void size of 1.0 µm or more per one aggregate particle.

In the above-mentioned vinyl chloride-based resin aggregate particles, the percentage of particles having a particle diameter of 1.0 µm or less after ultrasonic treatment is less than 3.0 vol %. In the present invention, "ultrasonic treatment" refers to irradiation with 28-kHz ultrasonic waves at 25° C. for 12 minutes. Specifically, a dispersion solution that is obtained by dispersing 0.5 g of the vinyl chloride-based resin aggregate particles in 100 ml of 0.5% dioctyl sodium sulfosuccinate aqueous solution is irradiated with 28-kHz ultrasonic waves at 25° C. for 12 minutes. More specifically, a 200 ml beaker (manufactured by HARIO CO., LTD.) containing a dispersion solution that is obtained by dispersing 0.5 g of the vinyl chloride-based resin aggregate particles in 100 ml of 0.5% dioctyl sodium sulfosuccinate aqueous solution is set in an ultrasonic cleaner (WT-300M Model manufactured by HONDA ELECTRONICS) filled with a predetermined amount of water (25° C.) so that a liquid level of the beaker is lower than a liquid level of the water filling the ultrasonic cleaner, and the dispersion solution is irradiated with 28-kHz ultrasonic waves at 25° C. for 12 minutes. Here, the percentage of particles having a particle diameter of 1.0 μm or less can be obtained by a particle size distribution measured on a volumetric basis. Incidentally, the particle size distribution can be measured using MICROTRACK HRA9320-X-100 Model (manufactured by Nikkiso Co., Ltd.), which is a laser diffraction particle size analyzer. When the percentage of particles having a particle diameter of 1.0 μm or less after ultrasonic treatment in the vinyl chloride-based resin aggregate particles is 3.0 vol % or more, the non-infiltrating property of the plastisol containing the vinyl chloride-based resin aggregate particles decreases. The more easily the vinyl chloride-based resin aggregate particles disintegrate by ultrasonic waves, i.e., the higher the percentage of particles having a particle diameter of 1.0 μm or less after ultrasonic treatment is, the lower the non-infiltrating property of the plastisol containing the vinyl chloride-based resin aggregate particles becomes. From the viewpoint of obtaining excellent non-infiltrating property, the percentage of particles having a particle diameter of 1.0 μm or less after ultrasonic treatment in the vinyl chloride-based resin aggregate particles is 2.0 vol % or less, more preferably 1.0 vol % or less, and particularly preferably 0 vol %.

Figure 7:
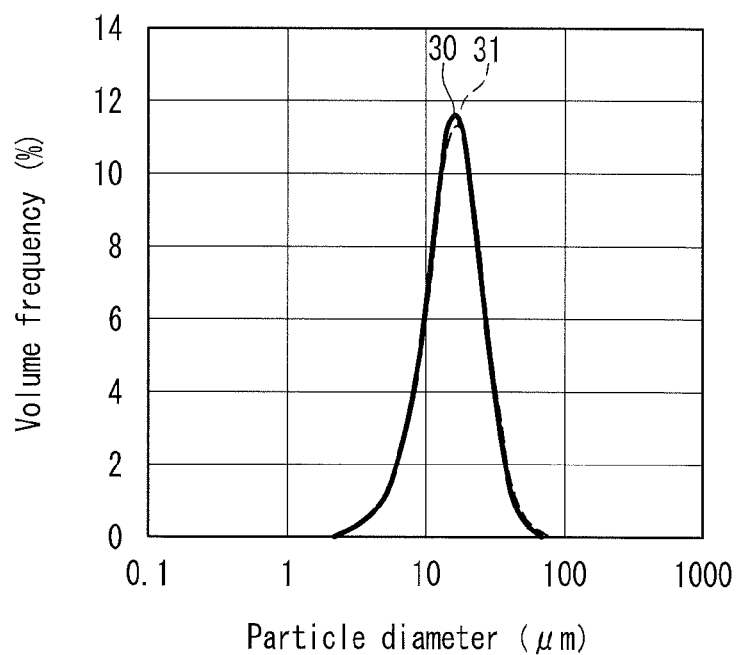
FIG. 7 is a graph showing a particle size distribution before and after ultrasonic treatment of the vinyl chloride-based resin aggregate particles in one Example of the present invention.
Figure 8:
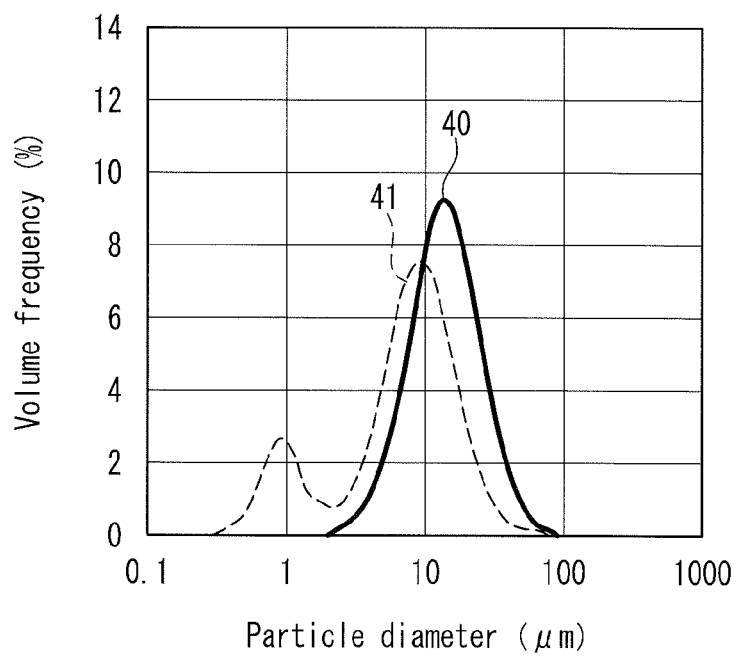
FIG. 8 is a graph showing a particle size distribution before and after ultrasonic treatment of the vinyl chloride-based resin aggregate particles in one Comparative Example of the present invention.

FIGS. 7 and 8 are graphs respectively showing particle size distributions before and after ultrasonic treatment of the vinyl chloride-based resin aggregate particles in one Example and one Comparative Example of the present invention. In FIG. 7, since a particle size distribution curve before ultrasonic treatment 30 and a particle size distribution curve after ultrasonic treatment 31 almost overlap with each other, and very few vinyl chloride-based resin aggregate particles disintegrate by the ultrasonic treatment, it can be understood that the vinyl chloride-based resin aggregate particles of the Example of the present invention are superior in resistance to disintegration by ultrasonic waves. Meanwhile, as can be seen from FIG. 8, in the vinyl chloride-based resin aggregate particles of the Comparative Example, a particle size distribution curve before ultrasonic treatment 40 and a particle size distribution curve after ultrasonic treatment 41 do not overlap with each other, and the vinyl chloride-based resin aggregate particles disintegrate by the ultrasonic treatment, which results in generation of particles having a particle diameter of 1.0 μm or less. Whether or not the vinyl chloride-based resin aggregate particles disintegrate by ultrasonic waves relies on a fusion force between the coagulated latex particles of vinyl chloride-based resin (primary aggregate particles) constituting the vinyl chloride-based resin aggregate particles (secondary aggregate particles). The fusion force between the coagulated latex particles of vinyl chloride-based resin (primary aggregate particles) increases with the heat treatment temperature and the concentration of the polymer solid at the time of the coagulation. Further, the fusion force therebetween also relies on the type of the coagulant and the type of the emulsifier used at the time of an emulsion polymerization. Particularly when using the inorganic acid as the coagulant and the fatty acid salt as the emulsifier, and setting the concentration of the polymer solid in the coagulated latex of vinyl chloride-based resin to be 30 wt % or more, it is possible to obtain resin aggregate particles having a high fusion force, which is preferable.

The moisture absorption coefficient of the above-mentioned vinyl chloride-based resin aggregate particles is preferably 1.5 wt % or less when they are retained for 24 hours under conditions of 30° C. and a relative humidity of 97.0±0.4% (tested by a desiccator method using a saturated aqueous solution of potassium sulfate) in accordance with an operation procedure of JIS A 1475 (hereinafter, also referred to as a moisture absorption coefficient, simply). If the moisture absorption coefficient is 1.5 wt % or less, the increase in viscosity due to moisture absorption of plastisol (thickening due to moisture absorption) is less likely to occur at the time of producing or storing the plastisol containing the vinyl chloride-based resin aggregate particles. The sagging property of the plastisol relies on the viscosity. As the viscosity of the plastisol increases, the sagging property of the plastisol decreases. If such a plastisol is applied on a glove, the glove will be heavy, thick and inflexible. Further, from the viewpoint of sagging property, the moisture absorption coefficient of the vinyl chloride-based resin aggregate particles is more preferably 1.0 wt % or less, and further preferably 0.75 wt % or less. When the moisture absorption coefficient is within this range, the thickening due to moisture absorption of the plastisol containing the vinyl chloride-based resin aggregate particles is less likely to occur, which makes it possible to provide the plastisol having favorable non-infiltrating property and sagging property even under a condition of high temperature and high humidity. By coating a glove with such a plastisol, it is possible to obtain a light and flexible glove.

Further, it is preferable for the plastisol containing the vinyl chloride-based resin aggregate particles, that the viscosity is changed less by the temperature rise from the viewpoint of sagging property. As mentioned above, the sagging property of the plastisol relies on the viscosity. Further, the viscosity of the plastisol is affected easily by temperature. In particular, when a plastisol containing vinyl chloride-based resin is heated from room temperature to a temperature approximate to the glass transition temperature of the vinyl chloride-based resin, in general the viscosity of the plastisol tends to increase gradually as gelation proceeds. As a result, at the time of applying the plastisol on the glove of fabric, the sagging property of the plastisol may change considerably if the viscosity changes greatly depending on the temperature of the mold for mounting the glove.

In a case where $\eta 40$ denotes a viscosity at a shear rate of 1 $s^{-1}$ of the plastisol retained at 40° C. for 10 minutes and $\eta 70$ denotes a viscosity at a share rate of 1 $s^{-1}$ of the plastisol that has been warmed from 40° C. at 10° C./min. and retained at 70° C. for 3 minutes, the viscosity change caused by the temperature rise can be evaluated by $\eta 70/\eta 40$ (heat thickening degree). Further, the evaluation of the $\eta 70/\eta 40$ (heat thickening degree) is performed by using a plastisol containing 100 weight parts of the above-mentioned vinyl chloride-based resin aggregate particles and 160 weight parts of di-2-ethylhexyl phthalate. For the measurement, in a case of using a plastisol that has been prepared or stored at room temperature, preferably the plastisol is heated from the room temperature to 40° C. and subsequently retained at 40° C. for 10 minutes before warming to 70° C. Further, the viscosity here can be measured in a simple manner using a commercially available rheometer having a function of temperature control, and an example thereof is AR2000 manufactured by TA Instruments. When the η70/η40 of the plastisol containing the above-mentioned vinyl chloride-based resin aggregate particles is in the range of 3 to 1000, the viscosity is increased less due to the warm-up of the plastisol and the sagging property is excellent. From the viewpoint of excellent sagging property and non-infiltrating property, the η70/η40 is preferably 5 to 110. When the η70/η40 (heat thickening degree) is 3 or higher, the plastisol exhibits favorable sagging property. Furthermore, the vinyl chloride-based resin aggregate particles will not disintegrate at the time of preparing the plastisol, the percentage of particles having a particle diameter of 10 to 60 μm will be at least 50 vol % easily, and thus the non-infiltrating property will be improved. Furthermore, when the η70/η40 (heat thickening degree) is 1000 or lower, the non-infiltrating property of the plastisol will be favorable easily. Moreover, the plastisol will experience less heat thickening even in a particularly high-temperature condition, and the sagging property is improved.

The above-mentioned η70/η40 (heat thickening degree) changes depending on the conditions for forming the aggregate particles, for example, the type and amount of the coagulant, the concentration of the polymer solid in the coagulated latex, the type of the heating medium, heat treatment temperature, heat treatment time and the like. In the present invention, the temperature and time for heat treatment are adjusted appropriately in a condition where the type and amount of the coagulant, the concentration of the polymer solid in the coagulated latex, and the type of the heating medium are preset respectively, thereby obtaining vinyl chloride-based resin aggregate particles having η70/η40 (heat thickening degree) in a range of 3 to 1000.

(Production Method for Vinyl Chloride-Based Resin Aggregate Particles)

Hereinafter, a method for producing the vinyl chloride-based resin aggregate particles of the present invention will be described. The vinyl chloride-based resin aggregate particles of the present invention can be obtained by aggregating vinyl chloride-based resin. Specifically, the vinyl chloride-based resin aggregate particles of the present invention can be obtained by: heat-treating a coagulated latex of vinyl chloride-based resin that has been coagulated by adding a coagulant to a vinyl chloride-based resin latex; adjusting a pH of a slurry containing obtained vinyl chloride-based resin aggregate particles; dewatering and drying the slurry containing vinyl chloride-based resin aggregate particles after pH adjustment, followed by pulverization and/or classification.

First, by adding for coagulation the coagulant to the vinyl chloride-based resin latex, the coagulated latex of vinyl chloride-based resin is obtained. Although the addition amount of the coagulant is not limited particularly as long as it can coagulate the vinyl chloride-based resin latex, it is preferably 0.3 to 5 weight parts with respect to 100 weight parts of the polymer solid in the vinyl chloride-based resin latex. When the addition amount of the coagulant is 0.3 weight parts or more, the coagulation of the vinyl chloride-based resin latex proceeds sufficiently and the vinyl chloride-based resin aggregate particles of the present invention can be obtained easily. Further, when the addition amount of the coagulant is 5 weight parts or less, the production cost can be reduced and the productivity becomes favorable.

The above-mentioned coagulant contains an inorganic acid in an amount of 50 wt % or more with respect to the total weight of the coagulant. When the content of the inorganic acid with respect to the total weight of the coagulant is 50 wt % or more, the moisture absorption coefficient of the vinyl chloride-based resin aggregate particles will be low, and the thickening due to moisture absorption of the plastisol containing the vinyl chloride-based resin aggregate particles will not occur easily. Hence, the sagging property of the plastisol becomes favorable, and a glove coated with the plastisol becomes light and flexible. From the viewpoint of reducing the moisture absorption coefficient of the vinyl chloride-based resin aggregate particles, suppressing the thickening due to moisture absorption of the plastisol containing the vinyl chloride-based resin aggregate particles, and improving the sagging property of the plastisol, the content of the inorganic acid in the coagulant is preferably 60 wt % or more, more preferably 90 wt % or more, and further preferably 100 wt %. Further, when the content of the inorganic acid with respect to the total weight of the coagulant is 50 wt % or more, the number of voids having a void size of 1.0 μm or more in the vinyl chloride-based resin aggregate particles will be few and the percentage of particles having a particle diameter of 1.0 μm or less after ultrasonic treatment also will be low. Hence, the non-infiltrating property and sagging property of the plastisol containing the vinyl chloride-based resin aggregate particles becomes more preferable. The more the coagulant contains the inorganic acid, the fewer the number of voids having a void size of 1.0 μm or more in the vinyl chloride-based resin aggregate particles becomes and the lower the percentage of particles having a particle diameter of 1.0 μm or less after ultrasonic treatment becomes. Therefore, it is particularly preferable that the coagulant is composed of the inorganic acid only.

The above-mentioned inorganic acid is not limited particularly, and examples thereof include sulfuric acid, hydrochloric acid, nitric acid and phosphoric acid. From the viewpoint of waste treatment, the inorganic acid is preferably at least one selected from the group consisting of sulfuric acid and hydrochloric acid.

A coagulant other than the inorganic acid to be contained in the above-mentioned coagulant is preferably a water-soluble coagulant from the viewpoint of obtaining a homogenous coagulated latex in a short time. Examples of the water-soluble coagulant include inorganic salts, organic acids and water-soluble polymers.

Examples of the inorganic salt include compounds or the like to be dissociated into cations such as $Na^+$, $K^+$, $Mg^{2+}$, $Ca^{2+}$, $Al^{3+}$, and $H^+$ and anions such as $Cl^-$, $Br^-$, $SO_4^{2-}$, $SO_3^{2-}$, $NO_2^-$, $NO_3^-$, $PO_4^{3-}$, $CO_3^{2-}$, and $OH^-$. Specifically, NaCl, KCl, $Na_2SO_4$, $CaCl_2$, $AlCl_3$, $Al_2(SO_4)_3$ and the like can be used.

Though there is no particular limitation, examples of the organic acid include citric acid, malic acid, tartaric acid, gluconic acid, succinic acid, malonic acid, glutaric acid, maleic acid, fumaric acid and glutaconic acid.

Examples of the organic salt include sodium acetate and calcium acetate.

For the water-soluble polymer, for example, a synthetic polymer, a natural polymer and a semi-synthetic polymer can be used. Examples of the synthetic polymer include a polymer of monomers containing an acryloyl group, vinyl polymer, polyamidine, polyethylene oxide, polyethyleneimine and the like. For the polymer of monomers containing an acryloyl group, for example, polyacrylamide, polymethacrylamide, polyacrylic acid, polymethacrylic acid, polyacrylic acid salt, polymethacrylic acid salt, polyacrylate, polymethacrylate and the like can be used. For the vinyl polymer, for example, vinyl polymers containing carboxyl groups, such as polyvinyl alcohol (PVA), polyvinylpyrrolidone, polyvinyl methyl ether, polyvinyl acetate, polystyrene sulfonic acid and polystyrene sulfonate and the like can be used. Examples of the natural polymer include polysaccharides, proteins and the like. For the polysaccharides, for example, starch, dextrin, glucomannan, galactomannan, gum Arabic, xanthan gum, pectin, carrageenan Locust bean gum, guar gum, traganth, chitin, chitosan, pullulan, alginate and the like can be used. For the proteins, gelatin, casein, collagen and the like can be used. Examples of the semi-synthetic polymer include cellulose ether, derivative of starch and the like. For the cellulose ether, methyl cellulose, ethyl cellulose, benzyl cellulose, trityl cellulose, cyanoethyl cellulose, aminoethyl cellulose, hydroxymethyl cellulose, hydroxyethyl cellulose, hydroxypropylmethyl cellulose, ethyl hydroxyethyl cellulose, methylhydroxypropyl cellulose, carboxymethyl cellulose, carboxyethyl cellulose and the like can be used. For the derivative of starch, for example, soluble starch, methyl starch, carboxymethyl starch and the like can be used. Incidentally, when using the water-soluble polymer as the coagulant other than the inorganic acid, from the viewpoint of lowering the moisture absorption coefficient of the vinyl chloride-based resin aggregate particles, an amount of the water-soluble polymer to be mixed in the coagulant is preferably 25 wt % or less and more preferably 10 wt % or less with respect to the total weight of the coagulant.

From the viewpoint of lowering the moisture absorption coefficient of the vinyl chloride-based resin aggregate particles, not causing the thickening due to moisture absorption of the plastisol easily and obtaining a light and flexible glove easily, the coagulant other than the inorganic acid is preferably one or more of inorganic salts, organic acids and organic salts.

The form of the above-mentioned coagulant to be added to the vinyl chloride-based resin latex may be any of a solid or an aqueous solution. From the viewpoint of dispersion, an aqueous solution is preferred. It is more preferable that the coagulant is added to the vinyl chloride-based resin latex in a fluid state due to stirring or mixing. Further, it is preferable that the addition of the coagulant into the vinyl chloride-based resin latex is performed after completion of the polymerization of the vinyl chloride-based resin.

Though there is no particular limitation, the vinyl chloride-based resin latex used in the present invention is obtained by preparing a vinyl chloride monomer or a mixture of a vinyl chloride monomer and a monomer that is co-polymerizable with the vinyl chloride monomer, to which is added in an aqueous medium for example, a polymerization initiator, an emulsifier, and further a dispersion adjuvant such as a high alcohol and a higher fatty acid as required, and by carrying out a micro-suspension polymerization, an emulsion polymerization, a seed micro-suspension polymerization, or a seed emulsion polymerization.

In the above-mentioned vinyl chloride-based resin latex, though there is no particular limitation, the mean volume particle diameter of the vinyl chloride-based resin is preferably 0.1 to 1.0 μm, and more preferably 0.15 to 0.5 μm. When the mean volume particle diameter of the vinyl chloride-based resin is 0.1 μm or more, the mechanical stability at the time of transporting the latex becomes favorable, and the productivity is improved. Further, when the mean volume particle diameter of the vinyl chloride-based resin is 1.0 μm or less, the obtained vinyl chloride-based resin aggregate particles have high strength, and the non-infiltrating property of the plastisol containing the vinyl chloride-based resin aggregate particles is exhibited easily. The mean volume particle diameter of the vinyl chloride-based resin can be calculated by measuring the particle size distribution of the vinyl chloride-based resin latex using NICOMP 380 manufactured by PARTICLE SIZING SYSTEMS, for example.

There is no particular limitation on the monomer that is co-polymerizable with the vinyl chloride monomer, and any monomers co-polymerizable with the vinyl chloride can be used. The examples include: olefins such as ethylene, propylene and butene; vinyl esters such as vinyl acetate, vinyl propionate and vinyl stearate; vinyl ethers such as methyl vinyl ether, ethyl vinyl ether, octyl vinyl ether and lauryl vinyl ether; vinylidenes such as vinylidene chloride; unsaturated carboxylic acids and acid anhydrides thereof, such as acrylic acid, methacrylic acid, fumaric acid, maleic acid, itaconic acid, maleic anhydride and itaconic anhydride; unsaturated carboxylic esters such as methyl acrylate, ethyl acrylate, monomethyl maleate, dimethyl maleate and butylbenzyl maleate; aromatic vinyl compounds such as styrene, α-methylstyrene, and divinylbenzene; unsaturated nitriles such as acrylonitrile; and crosslinking monomers such as diallyl phthalate. Preferably the amount of such a monomer in use is less than 50 wt % in a mixture with the vinyl chloride monomer.

Though there is no particular limitation, for the emulsifier for example, anionic surfactant can be used at about 0.1 to 3 weight parts for 100 weight parts of monomer in general. Examples of the anionic surfactant include: potassium salts, sodium salts and ammonium salts of fatty acid, alkyl sulfuric acid, alkyl benzene sulfonic acid, alkyl sulfosuccinic acid, α-olefin sulfonic acid, and alkyl ether phosphate. From the viewpoint of non-infiltrating property and sagging property, the emulsifier is preferably fatty acid salts, more preferably at least one selected from the group consisting of potassium salts of fatty acids, sodium salts of fatty acids and ammonium salts of fatty acids, and further preferably at least one selected from the group consisting of potassium stearate, potassium myristate, and ammonium myristate. In the case of using the fatty acid salt as the emulsifier, vinyl chloride-based resin aggregate particles can be obtained easily whose percentage of particles having a particle diameter of 1.0 μm or less after ultrasonic treatment is less than 3.0 vol % when the ultrasonic treatment is performed by irradiation with 28-kHz ultrasonic waves at 25° C. for 12 minutes, which is preferable. Further, when the inorganic acid is used as the coagulant and the fatty acid salt is used as the emulsifier, it is possible easily to obtain vinyl chloride-based resin aggregate particles whose number of voids having a void size of 1.0 μm or more is fewer and whose percentage of particles having a particle diameter of 1.0 μm or less after ultrasonic treatment is lower.

Examples of the polymerization initiator include oil-soluble polymerization initiators and water-soluble polymerization initiators. Examples of the oil-soluble polymerization initiator include organic peroxide-based initiators and azo-based initiators. Examples of the organic peroxide-based initiators include: diacyl peroxides such as dilauroyl peroxide, and di-3,5,5-trimethylhexanoyl peroxide; peroxydicarbonates such as diisopropylperoxydicarbonate, and di-2-ethylhexylperoxydicarbonate; and peroxyesters such as t-butylperoxy pivalate, and t-butylperoxyneodecanoate. The azo-based initiators include 2,2'-azobisisobutyronitrile, 2,2'-azobis(2,4-dimethylvaleronitrile), and 2,2'-azobis(4-methoxy-2,4-dimethylvaleronitrile). For the water-soluble polymerization initiator, ammonium persulfate, potassium persulfate, sodium persulfate, hydrogen peroxide solution or the like is used, and if necessary, a reducer such as sodium sulfite, sodium thiosulfate, formaldehyde sulfoxylate sodium dehydrate, ascorbic acid, sodium ascorbate or the like can be used concurrently. They can be used singly or as a combination of two or more.

It is preferable that the operation of mixing the vinyl chloride-based resin latex and the above-mentioned coagulant is performed so that the coagulated latex becomes homogenous in a short time in light of the purpose of achieving the object of the present invention. It is preferable, for example, that the coagulation operation is performed using a mixer that is capable of applying a strong shear force to the latex. Examples of the mixer include Onlator (trademark of Sakura Seisakusho, Ltd.) and a vertical vibration stirrer (e.g., "Vibro Mixer" manufactured by REICA Co., Ltd.). From the viewpoint of applying a shear force for homogenizing the coagulated latex in a short time, preferably the stirring power in the mixing (coagulating) operation is 2 kW/m$^3$ or more, and more preferably, 5 kW/m$^3$ or more. Though there is no particular upper limitation for the stirring power in the mixing operation, from the viewpoint of the equipment cost, preferably it is 50 kW/m$^3$ or less.

The temperature at the time of the coagulation by adding the coagulant to the above-mentioned vinyl chloride-based resin latex is not limited particularly as long as it is lower than the glass transition temperature Tg of the vinyl chloride-based resin. However, from the viewpoint of obtaining a homogenous coagulated latex in a short time in a strong shear field, the temperature is preferably in a range of 5° C. or higher to Tg−15° C. or lower. Here, "preparation temperature" indicates a temperature of the mixture immediately after mixing the vinyl chloride-based resin latex and the coagulant.

In the above-mentioned coagulated latex of vinyl chloride-based resin, the concentration of the polymer solid is 22 wt % or more, preferably 25 to 50 wt %, and more preferably 30 to 45 wt %. When the concentration of the polymer solid in the coagulated latex of vinyl chloride-based resin is 22 wt % or more, the η70/η40 of the plastisol containing the vinyl chloride-based resin aggregate particles will be 3 or more, and the sagging property and non-infiltrating property of the plastisol are improved. Further, when the concentration of the polymer solid in the coagulated latex of vinyl chloride-based resin is 25 to 50 wt %, it is possible easily to obtain vinyl chloride-based resin aggregate particles that have the apparent density of 0.21 to 0.34 and the mean volume particle diameter of 10 to 60 μm, and whose percentage of particles having a particle diameter of 10 to 60 μm is at least 50 vol %. Because of this, the non-infiltrating property of the plastisol containing the vinyl chloride-based resin aggregate particles becomes favorable and a glove coated with the plastisol easily can be made in a light weight. Moreover, when the concentration of the polymer solid in the coagulated latex of vinyl chloride-based resin is 25 to 50 wt %, the coagulated latex will have excellent fluidity and be conveyed easily through a pipe when being added to a container for the heat treatment. Further, when the concentration of the polymer solid in the coagulated latex of vinyl chloride-based resin is 30 to 50 wt %, it is possible easily to obtain vinyl chloride-based resin aggregate particles whose number of voids having a void size of 1.0 μm or more is fewer and whose percentage of particles having a particle diameter of 1.0 μm or less after ultrasonic treatment is lower.

When using the coagulant containing the inorganic acid in an amount of 50 wt % or more and the coagulated latex of vinyl chloride-based resin having the concentration of the polymer solid of 22 wt % or more, it is possible easily to obtain vinyl chloride-based resin aggregate particles whose number of voids having a void size of 1.0 μm or more per one aggregate particle is less than 5.0.

Next, the coagulated latex of vinyl chloride-based resin obtained in the above-mentioned manner is heat-treated at a temperature ranging from Tg or higher to Tg+35° C. or lower, whereby a slurry containing the vinyl chloride-based resin aggregate particles is obtained. When the heat treatment temperature is Tg or higher, the percentage of particles having a particle diameter of 10 μm or less in the vinyl chloride-based resin aggregate particles will be low, and the apparent density will be 0.21 g/ml or more. Because of this, the non-infiltrating property of the plastisol containing the vinyl chloride-based resin aggregate particles is improved and a light and flexible glove can be obtained. Further, when the heat treatment temperature is Tg+35° C. or lower, the value of the η70/η40 will not be large, and hence a light and flexible glove can be obtained easily even if the temperature of the mold for gloves is high. Further, when the heat treatment temperature is Tg or higher and Tg+35° C. or lower, the vinyl chloride-based resin aggregate particles will exhibit an excellent resistance to disintegration by ultrasonic waves, and the percentage of particles having a particle diameter of 1.0 μm or less after ultrasonic treatment will be low, which is less than 3.0 vol %. Further, in the heat treatment temperature ranging from Tg or higher to Tg+35° C. or lower, it is possible easily to obtain vinyl chloride-based resin aggregate particles whose percentage of particles having a particle diameter of 1.0 μm or less after ultrasonic treatment decreases, as the heat treatment temperature increases.

Though the glass transition temperature of the vinyl chloride-based resin varies depending on the molecular weight, composition of the copolymer or the like, in general, vinyl chloride resin obtained from only a monomer of vinyl chloride through a normal polymerization has a glass transition temperature of about 80° C. Measurement of the glass transition temperature can be performed using a differential scanning calorimeter (Model DSC220C manufactured by SII Nanotechnology Inc.) under operation conditions of temperature of 30 to 200° C. and a warm-up rate of 10° C./min. The heat treatment temperature is preferably 80 to 115° C., and more preferably 85 to 100° C. When the heat treatment temperature is within this range, vinyl chloride-based resin aggregate particles capable of improving the non-infiltrating property of plastisol can be obtained easily and hence a light and flexible glove can be obtained. Further, though the heat treatment time is not limited particularly, after reaching a predetermined temperature, the temperature is retained preferably for 30 seconds to 300 minutes, more preferably for 3 to 120 minutes, and further preferably for 5 to 30 minutes, in light of the industrial feasibility. In this manner, the coagulated latex of vinyl chloride-based resin is subjected to the heat treatment so as to aggregate the vinyl chloride-based resin particles, so that vinyl chloride-based resin aggregate particles capable of improving the non-infiltrating property of a plastisol can be obtained easily and hence a light and flexible glove can be obtained.

From the viewpoint of uniformly performing the heat treatment, the above-mentioned heat treatment is preferably preformed by mixing the coagulated latex of vinyl chloride-based resin with the heating medium that is at least one selected from the group consisting of water vapor and water bath. Though the type and pressure of the water vapor is not limited particularly as long as the temperature can be raised to not less than Tg of the vinyl chloride-based resin, water vapor of at least 0.1 MPa is preferred. In a case of a water bath, water vapor may be introduced to the water bath for maintaining a predetermined temperature.

In a case where the concentration of the polymer solid in the coagulated latex of vinyl chloride-based resin is 30 wt % or less, there is no particular limitation on the method for the heat treatment. It is preferable, for example, that the heat treatment is performed by feeding water vapor to the coagulated latex of vinyl chloride-based resin, i.e., by mixing the coagulated latex of vinyl chloride-based resin and the water vapor. The reason is that in a case where the concentration of the polymer solid in the coagulated latex of vinyl chloride-based resin is low, a heat treatment can be performed uniformly by mixing with the water vapor. Moreover, from the viewpoint of further uniform heat treatment, preferably the water vapor is fed continuously to the coagulated latex of vinyl chloride-based resin while stirring. Though there is no particular limitation on the rate for feeding the water vapor, from the viewpoint of productivity, preferably the rate is set so that the warm-up rate of the coagulated latex is 0.5 to 20° C./min., and more preferably 1 to 10° C./min. Though there is no particular limitation on the method of introducing the water vapor, from the industrial viewpoint, direct introduction into the coagulated latex during the heat treatment is convenient and preferable. Similarly, though there is no particular limitation on the method of stirring, stirring at least at a number of revolutions to secure the fluidity of the interior of the whole tank with the pulsator is preferred.

Further, in a case where the concentration of the polymer solid in the coagulated latex of vinyl chloride-based resin is more than 30 wt %, though the method for the heat treatment is not limited particularly, for example, preferably the heat treatment is performed by adding the coagulated latex of vinyl chloride-based resin into the water bath that has been set to the predetermined heat treatment temperature. The reason is that in a case where the concentration of the polymer solid in the coagulated latex of vinyl chloride-based resin is high, a uniform heat treatment can be performed easily in a water bath. Further, from the viewpoint of further uniform heat treatment, preferably the coagulated latex of vinyl chloride-based resin is added continuously into the water bath. In a case where the temperature of the water bath is lowered due to the continuous addition of the coagulated latex, it is preferable that water vapor or the like is fed continuously to the water bath, so as to maintain the heat treatment temperature at a predetermined temperature.

In a case where the coagulated latex of vinyl chloride-based resin is added continuously into the water bath at a predetermined temperature adjusted and subjected to the heat treatment while being discharged continuously, for example, an average residence time in the tank for the heat treatment (a value obtained by dividing the charging capacity (L) of the tank for the heat treatment by the feeding rate (L/min.) of the coagulated latex and water to be fed continuously into the heat treatment tank) corresponds to the heat treatment time. Though the heat treatment time is not limited particularly as long as the object of the present invention can be achieved, the time preferably is 30 seconds or more from the viewpoint of improving the non-infiltrating property of the plastisol containing the vinyl chloride-based resin aggregate particles.

Though there is no particular limitation, the above-mentioned heat treatment can be performed in a mixer or piping. The mixer used in the present invention is not limited particularly as long as it is an apparatus capable of mixing the coagulated latex particles as a whole to prevent the particles from precipitating. For example, an apparatus such as a stirring tank, a static mixer, Onlator (trademark of Sakura Seisakusho, Ltd.) or the like can be used.

Next, the pH of the slurry containing the obtained vinyl chloride-based resin aggregate particles is adjusted in a range of 4 to 11, preferably in a range of 5 to 10, and more preferably in a range of 6 to 9. When the pH is within this range, the moisture absorption coefficient of the resultant vinyl chloride-based resin aggregate particles will be low and the sagging property of the plastisol to which water is added (water-added plastisol) will be favorable. Because of this, a glove coated with the plastisol will be light and flexible. Further, there is a tendency that the closer the pH is to neutral, the lower the moisture absorption coefficient of the resultant vinyl chloride-based resin aggregate particles becomes, which is preferable. Further, when the pH is within this range, the percentage of particles having a particle diameter of 1.0 μm or less after ultrasonic treatment in the resultant vinyl chloride-based resin aggregate particles will be low and the non-infiltrating property of the plastisol containing the vinyl chloride-based resin aggregate particles will be favorable.

Next, by dewatering and drying the slurry containing the vinyl chloride-based resin aggregate particles after pH adjustment, followed by pulverization and/or classification, the mean volume particle diameter and the particle size distribution are adjusted. Thus, vinyl chloride-based resin aggregate particles whose percentage of particles having a desired particle diameter can be obtained.

Though there is no particular limitation, the above-mentioned dewatering can be performed through filtration. Further, after the dewatering, from the viewpoint of reducing the moisture absorption coefficient of the resultant vinyl chloride-based resin aggregate particles, it is preferable that the slurry is washed with pure water having the same pH as the slurry and dewatered further. Though an amount of pure water used for the washing is not limited particularly as long as resin can be washed with water, it is preferably in an amount of 2 to 20 times as much as the resin weight, from the viewpoint of sufficient washing. Further, though there is no particular limitation on a dewaterer used in the above-mentioned dewatering, for example, a decanter, a centrifugal dehydrator, a horizontal belt filter, a belt filter, a screw press, a drum filter and the like can be used.

Similarly, there is no particular limitation on the dryer. For example, an airstream dryer, a fluidizing dryer, a belt dryer, a box dryer and the like can be used. Though there is no particular limitation, typically the drying temperature is 50 to 220° C. as the hot air temperature, and about 35 to 100° C. as the resin temperature.

Similarly, there is no particular limitation on the pulverizer or the crusher, and for example, a roller mill, a high-speed rotation pulverizer, a ball mill, a jet mill and the like can be used. Further, an air classifier or a pulverizer with a classification function can be used so that the particle size distribution is adjusted to the desired one.

It is possible to add a plasticizer to the vinyl chloride-based resin aggregate particles of the present invention so as to be used as a plastisol. As required, the plastisol may contain any vinyl chloride-based resin other than the above-mentioned vinyl chloride-based resin aggregate particles, a stabilizer, a diluent, a viscosity reducing agent, a filler, a reinforcer, an antioxidant, an ultraviolet absorber, a foaming agent, a flame retardant, an antistatic agent, a lubricant, a pigment, a surface preparation agent, a thixotrope, an adhesion promoter, a fungicide and the like.

Though there is no particular limitation on the above-mentioned plasticizer, examples of the applicable plasticizer include: phthalate plasticisers such as di-2-ethylhexyl phthalate, di-normal octyl phthalate, dibutyl phthalate, diisononyl phthalate, and butylbenzyl phthalate; phosphate plasticizers such as tricresyl phosphate, and tri-2-ethylhexyl phosphate; adipate plasticizers such as di-2-ethylhexyl adipate; sebacate plasticizers such as di-2-ethylhexyl sebacate; azelate plasticizers such as di-2-ethylhexyl azelate; trimellitate plasticizers such as tri-2-ethylhexyl trimellitate; polyester-based plasticizers; benzoate plasticizers such as di-2-ethylhexyl benzoate, diethylene glycol dibenzoate, and 2,2,4-trimethyl-1,3-pentanediol isobutylate benzoate; citrate plasticizers such as acetyl tributyl citrate; glycolate plasticizers; chlorinated paraffin-based plasticizers; chlorinated fatty acid ester-based plasticizers; epoxy-based plasticizers; and texanol isobutylate. These can be used singly or as a combination of two or more. Though there is no particular limitation on the use amount of the plasticizer, for example, it is used in a range of 50 to 200 weight parts with respect to 100 weight parts of the vinyl chloride-based resin containing the vinyl chloride-based resin aggregate particles of the present invention.

Though there is no particular limitation, examples of stabilizer that can be used for the above-mentioned stabilizer include: organotin stabilizers such as dimethyltin mercapto, dibutyltin mercapto, dioctyltin mercapto, dibutyltin malate, dioctyltin malate and dibutyltin laurate; lead-based stabilizers such as lead stearate, dibasic lead phosphite, and tribasic lead sulfate; calcium-zinc based stabilizers; barium-zinc based stabilizers; epoxidized soybean oil; epoxidized linseed oil; epoxidized tetrahydro phthalate; epoxidized polybutadiene; and ester phosphate. These can be used singly or as a combination of two or more. Further, though there is no particular limitation on the use amount of the stabilizer, for example, it is used in a range of 0 to 20 weight parts with respect to 100 weight parts of the vinyl chloride-based resin containing the vinyl chloride-based resin aggregate particles of the present invention.

Though there is no particular limitation, for the above-mentioned diluent, for example, 2,2,4-trimethyl-1,3-pentadiol di-isobutylate (TXIB), normal paraffin, iso-paraffin and the like can be used. These can be used singly or as a combination of two or more. Though there is no particular limitation on the use amount of the diluent, for example, it is used in a range of 0 to 200 weight parts with respect to 100 weight parts of the vinyl chloride-based resin containing the vinyl chloride-based resin aggregate particles of the present invention.

Though there is no particular limitation on the above-mentioned filler, examples of available filler include calcium carbonate, magnesium carbonate, lithium carbonate, kaolin clay, gypsum, mica, talc, magnesium hydroxide, calcium silicate, borax and the like. Similarly, though there is no particular limitation on the use amount of the filler, it is preferable in general that 0 to 500 weight parts of the filler is used with respect to 100 weight parts of the vinyl chloride-based resin containing the vinyl chloride-based resin aggregate particles of the present invention. More preferably, it is used in a range of 0 to 200 weight parts, and further preferably 0 to 100 weight parts.

For the viscosity reducing agent, reinforcer, antioxidant, ultraviolet absorber, foaming agent, flame retardant, antistatic agent, lubricant, pigment, surface preparation agent, thixotrope, adhesion promoter and fungicide, these agents can be used in a range for achieving the object of the present invention.

The plastisol containing the vinyl chloride-based resin aggregate particles obtained in the above-mentioned manner is applied on the fabric surface of the glove and heated for gelation. Thereby a glove coated with the vinyl chloride-based resin is obtained. The glove, which has been treated with the plastisol containing the vinyl chloride-based resin aggregate particles and that is excellent in non-infiltrating property and sagging property, is light-weight, flexible and comfortable in use. Further, the glove has an improved mechanical strength, excellent wear resistance, chemical resistance and oil resistance, and thus it can be used in various fields such as fisheries, agriculture, mining and the like.

EXAMPLES

Hereinafter, the present invention will be described in further detail by way of Examples. It should be noted that the present invention is not limited to the following Examples. In the description below, "%" and "part(s)" respectively indicate "wt %" and "weight part(s)" unless there is some annotation.

First, methods of measurement and evaluation used in Examples and Comparative Examples are explained.

(Glass Transition Temperature)

Measurement was performed using a differential scanning calorimeter (Model DSC220C manufactured by SII Nanotechnology Inc.) in operation conditions of temperature of 30 to 200° C. and a warm-up rate of 10° C./min.

(Mean Volume Particle Diameter of Vinyl Chloride-Based Resin)

Vinyl chloride-based resin latex was used as a test sample. The particle size distribution was measured at 25° C. using NICOMP 380 manufactured by PARTICLE SIZING SYSTEMS. The measurement cycle was 3 minutes×5 times, and the mean volume particle diameter of the vinyl chloride-based resin was calculated from the particle size distribution on a volumetric basis in the Gaussian distribution of the fifth data. The measurement conditions were: laser wavelength: 635 nm; strength: 1.2; illuminating angle: 90°; liquid viscosity: 0.933 cP; and refractive index: 1.333. A glass vessel that is 6 mm in inner diameter, 50 mm in height, which is manufactured by Kimble Chase Life Science and Research Products, LLC, was used, and measurement was performed in a Drop-In Cell method. For the measurement sample, vinyl chloride-based resin latex was used. The latex was previously filtered with a wire screen of 350 mesh, to which ion-exchange water filtered with a 0.2 μm filter was added, and the strength was adjusted to a range of 300±50.

(Shear Force at the Time of Coagulation Operation of Vinyl Chloride-Based Resin Latex)

Regarding the shear force to be applied at the time of coagulating the vinyl chloride-based resin latex, the stirring power was employed for the index, the stirring torque at the time of stirring was calculated from the actual measurement value, which was then classified into three grades below.

Strong: stirring power is 5 kW/m$^3$ or more (extremely-strong shear force is applied).

Moderate: stirring power is 2 kW/m$^3$ or more and less than 5 kW/m$^3$.

Weak: stirring power is less than 2 kW/m$^3$ (shear force is weak).

(Mean Volume Particle Diameter and Particle Percentage of Vinyl Chloride-Based Resin Aggregate Particles)

The particle size distribution of the vinyl chloride-based resin aggregate particles was measured on a volumetric basis using MICROTRACK HRA9320-X-100 Model (manufactured by Nikkiso Co., Ltd.) that is a particle size analyzer, thereby calculating the mean volume particle diameter. The measurement conditions were: temperature: 25° C.; substance information: transparent; refractive index: 1.51; and spherical particles: no check. Water was used for the carrier, and the refractive index was set to 1.33. Furthermore, SET ZERO: 10 seconds; measurement time: 10 seconds; and DRY CUT no calculation. Based on the particle size distribution measured similarly to the above manner, a volume fraction (%) of the particles having a particle diameter of 10 to 60 μm was calculated to obtain the percentage (vol %) of particles having a particle diameter of 10 to 60 μm.

(Moisture Absorption Coefficient)

The vinyl chloride-based resin aggregate particles (moisture content: 0.1 wt % or less) introduced in an aluminum cup was used as a sample. The sample was placed in a desiccator with the bottom filled with a sufficient amount of water, and retained for 24 hours under an atmosphere of 30° C. After a lapse of 24 hours, the sample in the desiccator was taken out, and the weight was measured. $W_W$ denotes the weight of the vinyl chloride-based resin aggregate particles measured at this time. After the measurement of the weight, the sample was retained for 1 hour in a hot air circulative thermostat at 105° C. so as to evaporate the moisture absorbed. After the evaporation of moisture, the sample was taken out from the thermostat, retained in a desiccator with the bottom covered with dry silica gel, and cooled to room temperature. After the cooling to the room temperature, the sample in the desiccator was taken out, and the weight was measured. $W_D$ denotes the weight of the vinyl chloride-based resin aggregate particles measured at this time. Based on the above-mentioned values $W_W$ and $W_D$, the moisture absorption coefficient of the vinyl chloride-based resin aggregate particles was obtained from the formula 1 below.

[Formula 1]

$$\text{Moisture absorption coefficient (wt \%)} = [(W_W - W_D)/W_D] \times 100 \quad (1)$$

(Apparent Density)

An apparent density of the vinyl chloride-based resin aggregate particles was measured using Powder Tester PT-R (manufactured by Hosokawa Micron Group) based on JIS K 7365.

(Method for Measuring η70/η40)

First, 100 weight parts of vinyl chloride-based resin aggregate particles was added to 160 weight parts of plasticizer (di-2-ethylhexyl phthalate), which was kneaded at 25° C. at 500 rpm for 3 minutes using a dissolver-type kneader (ROBO MICS manufactured by TOKUSHU KIKA; having a dissolver wing 5 cm in diameter), thereby preparing a plastisol. The warm-up viscosity of the obtained plastisol was measured using a rheometer (model: AR2000; rotor: flat plate 4 cm in diameter; gap: 0.35 mm; shear rate: 1 $s^{-1}$) manufactured by TA Instruments. In the measurement, a plastisol prepared at 25° C. was set in the rheometer, and heated to 40° C. at a warm-up rate of 5° C./min. Thereafter it was retained at 40° C. for 10 minutes, heated to 70° C. at a warm-up rate of 10° C./min., and then retained at 70° C. for 3 minutes. The η70/η40 was calculated by setting the viscosity at the time of retaining at 40° C. for 10 minutes as η40 and by setting the viscosity at the time of retaining at 70° C. for 3 minutes as η70.

(Measurement of Void Size)

0.2 g of the vinyl chloride-based resin aggregate particles was added to 1.0 g of an epoxy adhesive, and the whole was mixed uniformly, thereby preparing a mixed solution. The obtained mixed solution was filled in a gelatin capsule and left for 24 hours at room temperature (20±5° C.) so as to harden the epoxy adhesive, thereby forming a hardened mixture. The obtained hardened mixture was taken out from the gelatin capsule and dipped in liquid nitrogen for 15 minutes for freezing. Then, a cutter edge was placed on the frozen hardened mixture and hit with a wooden hammer from above to fracture the hardened mixture. Thus, fractured surfaces were formed. Next, platinum-palladium was vapor-deposited on the fractured surfaces of the vinyl chloride-based resin aggregate particles, and observed using a scanning electron microscope ("S-4800" manufactured by Hitachi High-Technologies Corporation, 3000× magnification). The number of voids having a void size of 1.0 μm or more in 10 fractured surfaces of the vinyl chloride-based resin aggregate particles selected at random was counted and averaged, and the value averaged was defined as the number of voids having a void size of 1.0 μm or more per one vinyl chloride-based resin aggregate particle.

(Measurement of the Percentage of Particles Having a Particle Diameter of 1.0 μm or Less After Ultrasonic Treatment)

0.5 g of the vinyl chloride-based resin aggregate particles was added to a 200 ml beaker (manufactured by HARIO CO., LTD.) containing 100 ml of 0.5% dioctyl sodium sulfosuccinate aqueous solution, and the dispersion solution was adjusted at 25° C. Meanwhile, a predetermined amount of water (25° C.) was poured into an ultrasonic cleaner (WT-300M Model manufactured by HONDA ELECTRONICS). The beaker containing the above-mentioned dispersion solution was set in the ultrasonic cleaner so that a liquid level of the beaker would be lower than a liquid level of the ultrasonic cleaner, and the dispersion solution was irradiated with 28-kHz ultrasonic waves at 25° C. for 12 minutes. The particle size distribution of the vinyl chloride-based resin aggregate particles after ultrasonic treatment was measured on a volumetric basis using MICROTRACK HRA9320-X-100 Model (manufactured by Nikkiso Co., Ltd.), which is a particle size analyzer, and a volume fraction (%) of the particles having a particle diameter of 1.0 μm or less was calculated to obtain the percentage of particles having a particle diameter of 1.0 μm or less. Conditions for measuring the particle diameter were: temperature: 25° C.; substance information: transparent; refractive index: 1.51; and spherical particles: no check. Water was used for the carrier, and the refractive index was set to 1.33. Furthermore, SET ZERO: 10 seconds; measurement time: 10 seconds; and DRY CUT no calculation.

(Evaluations of Non-Infiltrating Property and Sagging Property)

To 100 weight parts of vinyl chloride-based resin aggregate particles, 75 weight parts of general-purpose vinyl chloride resin paste ("PSM-30" manufactured by KANEKA CORPORATION), 210 weight parts of plasticizer (di-2-ethylhexyl phthalate), and 3 weight parts of stabilizer ("SC73" manufactured by Asahi Denka Co., Ltd.) were added, which was mixed and defoamed for 10 minutes in a stirring tank at 25° C. so as to prepare a plastisol. Separately, a test tube 3 cm in outer diameter and 20 cm in length (corresponding to a mold) and also a fabric [a knitted fabric (circular knitted or flat knitted) of 35 gauge and 216 g/m² in unit weight using a cotton yarn No. 32 (cotton count)] 2.5 cm in outer diameter and 15 cm in length that had been sewn to be shaped like a test tube so as to be tightly mounted to the outside of the test tube were prepared. The fabric was covered on the outside of the test tube from the bottom so that the seams of the fabric would be facing inside. This was a laboratory level substitute for a fabric glove mounted on a mold. The fabric was bound to the test tube at the upper end with a cotton yarn in order to prevent the fabric from shifting during a measurement. A test tube covered with the fabric (sample) was retained for 1 hour in a hot air circulative thermostat of 70° C. so as to heat the sample to 70° C. Immediately after taking the sample out from the thermostat, 200 g of the plastisol prepared in the above-mentioned manner was applied by flowing down from the upper side of the fabric. Subsequently the sample applied with the plastisol was hung with its bottom facing downward for 10 minutes under an atmosphere of 25° C. in order to drip excessive plastisol. Later, the sample was heated in a furnace adjusted at 190° C. for 10 minutes so as to gelate the plastisol. After air-cooling the sample taken out of the furnace, the fabric coated with the gel was detached from the test tube and cut from the bottom to be 10 cm in length.

The non-infiltrating property of the plastisol was evaluated by visually observing cut fabrics, and classified into three grades below. Grade-A and Grade-B indicate 'acceptable', while Grade-C indicates 'unacceptable'.

A: the gel does not infiltrate into the back face of the fabric.
B: the gel infiltrates slightly into the back face of the fabric.

C: a large amount of the gel infiltrates into the back face of the fabric (poor non-infiltrating property).

The sagging property of the plastisol was evaluated by measuring the weight of gel-coated fabrics after being cut to 10 cm, and classified into three grades below. Grade-A and Grade-B indicate 'acceptable', while Grade-C indicates 'unacceptable'.

A: the weight is less than 10 g.
B: the weight is 10 g or more and less than 12 g.
C: the weight is 12 g or more (poor sagging property of plastisol).

(Evaluations of Sagging Property of Water-Added Plastisol)

Pure water equivalent to 0.2 wt % of the weight of the plastisol was added to the plastisol used in the above-mentioned evaluations of the non-infiltrating property and sagging property, and mixed for 10 minutes in a stirring tank at 25° C., thereby preparing a water-added plastisol. Similarly to the above-mentioned evaluation of the sagging property of plastisol, the sagging property of water-added plastisol was evaluated using the thus obtained water-added plastisol.

Manufacture Example 1

Into a 300 L jacketed pressure-resistant vessel, 110 kg of vinyl chloride monomer, 110 kg of ion-exchange water, 40 g of ammonium persulfate and 0.3 g of copper (II) sulfate pentahydrate (catalyst for redox reaction) were charged and warmed to 50° C., to which 9 kg of 1% sodium sulfite aqueous solution and 7 kg of 10% ammonium myristate aqueous solution were added continuously while stirring so as to be polymerized. After performing polymerization until the polymerization pressure was lowered by 0.15 MPa from the initial pressure (0.7 MPa), the residual monomer was recovered to obtain vinyl chloride-based resin latex. The polymerization conversion ratio of the finally-obtained vinyl chloride-based resin latex with respect to the total amount of the initially-charged monomer and the added monomer (hereinafter described as the whole monomer amount) was 90%. In the obtained vinyl chloride-based resin latex, the mean volume particle diameter of the vinyl chloride-based resin was 0.3 μm. The concentration of the polymer solid in the vinyl chloride-based resin latex was 46%. The glass transition temperature of the vinyl chloride-based resin measured in the above-mentioned manner was about 80° C.

Manufacture Example 2

A vinyl chloride-based resin latex was obtained similarly to Manufacture Example 1 except that potassium stearate was used as the emulsifier instead of ammonium myristate. In the obtained vinyl chloride-based resin latex, the mean volume particle diameter of the vinyl chloride-based resin was 0.3 μm. The concentration of the polymer solid in the vinyl chloride-based resin latex was 46%. The glass transition temperature of the vinyl chloride-based resin measured in the above-mentioned manner was about 80° C.

Manufacture Example 3

A vinyl chloride-based resin latex was obtained similarly to Manufacture Example 1 except that potassium myristate was used as the emulsifier instead of ammonium myristate. In the obtained vinyl chloride-based resin latex, the mean volume particle diameter of the vinyl chloride-based resin was 0.3 μm. The concentration of the polymer solid in the vinyl chloride-based resin latex was 46%. The glass transition temperature of the vinyl chloride-based resin measured in the above-mentioned manner was about 80° C.

Manufacture Example 4

A vinyl chloride-based resin latex was obtained similarly to Manufacture Example 1 except that the charged monomer component was a mixture of 104.5 kg of vinyl chloride monomer and 5.5 kg of vinyl acetate monomer. In the obtained vinyl chloride-based resin latex, the mean volume particle diameter of the vinyl chloride-based resin was 0.3 μm. The concentration of the polymer solid in the vinyl chloride-based resin latex was 46%. The glass transition temperature of the vinyl chloride-based resin measured in the above-mentioned manner was about 78° C.

Manufacture Example 5

A vinyl chloride-based resin latex was obtained similarly to Manufacture Example 1 except that the charged monomer component was a mixture of 99 kg of vinyl chloride monomer and 11 kg of vinyl acetate monomer. In the obtained vinyl chloride-based resin latex, the mean volume particle diameter of the vinyl chloride-based resin was 0.3 μm. The concentration of the polymer solid in the vinyl chloride-based resin latex was 46%. The glass transition temperature of the vinyl chloride-based resin measured in the above-mentioned manner was about 76° C.

Manufacture Example 6

A vinyl chloride-based resin latex was obtained similarly to Manufacture Example 1 except that the charged monomer component was a mixture of 93.5 kg of vinyl chloride monomer and 16.5 kg of vinyl acetate monomer. In the obtained vinyl chloride-based resin latex, the mean volume particle diameter of the vinyl chloride-based resin was 0.3 μm. The concentration of the polymer solid in the vinyl chloride-based resin latex was 45%. The glass transition temperature of the vinyl chloride-based resin measured in the above-mentioned manner was about 74° C.

Manufacture Example 7

A vinyl chloride-based resin latex was obtained similarly to Manufacture Example 1 except that sodium dodecyl sulfate (SDS) was used as the emulsifier instead of ammonium myristate. In the obtained vinyl chloride-based resin latex, the mean volume particle diameter of the vinyl chloride-based resin was 0.3 μm. The concentration of the polymer solid in the vinyl chloride-based resin latex was 46%. The glass transition temperature of the vinyl chloride-based resin measured in the above-mentioned manner was about 80° C.

Example 1

As shown in FIG. 1, 114 kg of the vinyl chloride-based resin latex obtained in Manufacture Example 1 was charged in a first mixer 10 (300 L tank) equipped with a stirrer 15, and pure water was added so that the concentration of the polymer solid in the latex after coagulation would be 30%, and the temperature was adjusted to 40° C. Then, hydrochloric acid was used as the coagulant. A 10% hydrochloric acid aqueous solution was added to the vinyl chloride-based resin latex for one minute while being stirred so that the addition amount of hydrochloric acid would be 1 weight part with respect to 100 weight parts of the polymer solid in the vinyl chloride-based resin latex. The obtained mixture of the vinyl chloride-based resin latex and the coagulant was stirred and mixed for 30 minutes under a strong shear force of 5 kW/m$^3$ or more, thereby obtaining a coagulated latex of vinyl chloride-based resin. The obtained coagulated latex of vinyl chloride-based resin was sent by a pump 12 to a second mixer 11 (300 L tank) equipped with a stirrer 16. During this transfer, the coagulated latex was mixed with water vapor of 0.3 MPa by use of a vapor mixer 13 so that the outlet temperature of the vapor mixer 13 would be 105° C. After finishing the transfer, in the second mixer 11, the mixture of the coagulated latex of vinyl chloride-based resin and the water vapor was stirred while supplying water vapor 14, and retained at 105° C. for 30 minutes, i.e., subjected to a heat treatment.

After the heat treatment, cold water was supplied to the jacket of the second mixer 11 until the inner temperature of the second mixer 11 became 80° C. or lower. At the stage where the inner temperature of the second mixer 11 became 80° C. or lower, a slurry containing the vinyl chloride-based resin aggregate particles (hereinafter, also referred to as aggregate particles, simply) was adjusted to pH 7 using 5% sodium hydroxide aqueous solution. Incidentally, before the pH adjustment, the pH of the slurry containing the aggregate particles was 2.5. After the pH adjustment, the slurry containing the aggregate particles was discharged from the second mixer 11. Then, the slurry containing the aggregate particles was dewatered through filtration, washed with pure water in an amount 10 times as much as the resin weight, and dewatered again through filtration. The obtained wet resin was subjected to a ventilation drying for 48 hours using a constant temperature dryer (DX402 model, supplied by Yamato Scientific Co., Ltd.) that had been set at 60° C., thereby obtaining a dry powder (aggregate particles). Further, the obtained dry powder was pulverized with Mikro Bantam Mill AP-B pulverizer manufactured by Hosokawa Micron Corporation such that the mean volume particle diameter and the percentage of particles having a particle diameter of 10 to 60 μm would be the values as shown in Table 1, thereby obtaining pulverized particles (aggregate particles).

Example 2

Figure 2:
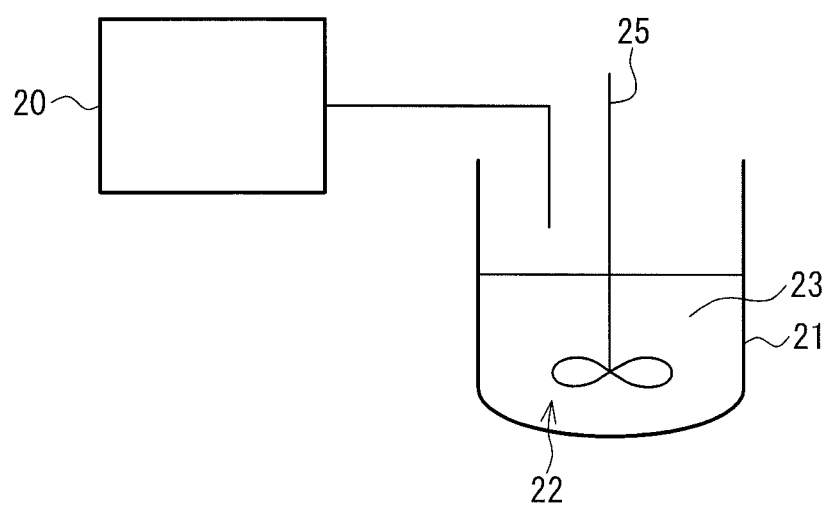
FIG. 2 is a schematic view illustrating another exemplary step of producing vinyl chloride-based resin aggregate particles.

As shown in FIG. 2, 15.5 kg of the vinyl chloride-based resin latex obtained in Manufacture Example 1 was charged in a mixer 20, and pure water was added so that the concentration of the polymer solid in the latex after coagulation would be 40% while the temperature was adjusted to 40° C. Then, hydrochloric acid was used as the coagulant. A 10% hydrochloric acid aqueous solution was added to the vinyl chloride-based resin latex for one minute while being stirred so that the addition amount of hydrochloric acid would be 1 weight part with respect to 100 weight parts of the polymer solid in the vinyl chloride-based resin latex. The obtained mixture of the vinyl chloride-based resin latex and the coagulant was stirred and mixed for 30 minutes under a strong shear force of 5 kW/m$^3$ or more, thereby obtaining a coagulated latex of vinyl chloride-based resin.

21 kg of hot water 23 (105° C.) was charged into a 50 L tank 21 equipped with a stirrer 25, to which the coagulated latex of vinyl chloride-based resin obtained as mentioned above was added continuously for about 10 minutes. The obtained mixture was retained at 105° C. for 30 minutes while being stirred, i.e., subjected to a heat treatment. The concentration of the polymer solid in the coagulated latex of vinyl chloride-based resin after the heat treatment was 18%. During the heat treatment, water vapor 22 of 0.3 MPa was fed continuously so that the temperature of the mixture would be retained at 105° C.

Then, cold water was supplied to the jacket of the 50 L tank 21 until the inner temperature of the 50 L tank 21 became 80° C. or lower. At the stage where the inner temperature of the 50 L tank 21 became 80° C. or lower, the slurry containing the aggregate particles was adjusted to pH 7 using 5% sodium hydroxide aqueous solution. Incidentally, before the pH adjustment, the pH of the slurry containing the aggregate particles was 2.6. After the pH adjustment, the slurry containing the aggregate particles was discharged from the 50 L tank 21. Then, the slurry containing the aggregate particles was dewatered through filtration, washed with pure water in an amount 10 times as much as the resin weight, and dewatered again through filtration. The obtained wet resin was subjected to a ventilation drying for 48 hours using a constant temperature dryer (DX402 model, supplied by Yamato Scientific Co., Ltd.) that had been set at 60° C., thereby obtaining a dry powder (aggregate particles). Further, the obtained dry powder was pulverized with Mikro Bantam Mill AP-B pulverizer manufactured by Hosokawa Micron Corporation such that the mean volume particle diameter and the percentage of particles having a particle diameter of 10 to 60 μm would be the values as shown in Table 1, thereby obtaining pulverized particles (aggregate particles).

Example 3

Pulverized particles (aggregate particles) were obtained similarly to Example 2 except that sulfuric acid (10% sulfuric acid aqueous solution) was used as the coagulant instead of hydrochloric acid (10% hydrochloric acid aqueous solution), and the heat treatment was performed at 100° C. The mean volume particle diameter of the obtained pulverized particles (aggregate particles) and the percentage of particles having a particle diameter of 10 to 60 μm are as shown in Table 1.

Example 4

Pulverized particles (aggregate particles) were obtained similarly to Example 3 except that the heat treatment was performed at 85° C. The mean volume particle diameter of the obtained pulverized particles (aggregate particles) and the percentage of particles having a particle diameter of 10 to 60 μm are as shown in Table 1.

Example 5

Pulverized particles (aggregate particles) were obtained similarly to Example 3 except that the heat treatment was performed at 110° C. The mean volume particle diameter of the obtained pulverized particles (aggregate particles) and the percentage of particles having a particle diameter of 10 to 60 μm are as shown in Table 1.

Example 6

Pulverized particles (aggregate particles) were obtained similarly to Example 3 except that at the stage where the inner temperature of the second mixer 11 became 80° C. or lower, the slurry containing the aggregate particles was adjusted to pH 5 using 5% sodium hydroxide aqueous solution, and the washing after dewatering through filtration was performed with pure water that had been adjusted to pH 5 using sulfuric acid. Incidentally, before the pH adjustment, the pH of the slurry containing the aggregate particles was 2.6. The mean volume particle diameter of the obtained pulverized particles (aggregate particles) and the percentage of particles having a particle diameter of 10 to 60 μm are as shown in Table 1.

Example 7

Pulverized particles (aggregate particles) were obtained similarly to Example 3 except that at the stage where the inner temperature of the second mixer 11 became 80° C. or lower, the slurry containing the aggregate particles was adjusted to pH 10 using 5% sodium hydroxide aqueous solution, and the washing after dewatering through filtration was performed with pure water that had been adjusted to pH 10 using sodium hydroxide. Incidentally, before the pH adjustment, the pH of the slurry containing the aggregate particles was 2.6. The mean volume particle diameter of the obtained pulverized particles (aggregate particles) and the percentage of particles having a particle diameter of 10 to 60 μm are as shown in Table 1.

Example 8

Pulverized particles (aggregate particles) were obtained similarly to Example 3 except that the vinyl chloride-based resin latex obtained in Manufacture Example 2 was used. The mean volume particle diameter of the obtained pulverized particles (aggregate particles) and the percentage of particles having a particle diameter of 10 to 60 μm are as shown in Table 1.

Example 9

Pulverized particles (aggregate particles) were obtained similarly to Example 3 except that the vinyl chloride-based resin latex obtained in Manufacture Example 3 was used. The mean volume particle diameter of the obtained pulverized particles (aggregate particles) and the percentage of particles having a particle diameter of 10 to 60 μm are as shown in Table 1.

Example 10

Pulverized particles (aggregate particles) were obtained similarly to Example 3 except that the vinyl chloride-based resin latex obtained in Manufacture Example 4 was used, and the heat treatment was performed at 95° C. The mean volume particle diameter of the obtained pulverized particles (aggregate particles) and the percentage of particles having a particle diameter of 10 to 60 μm are as shown in Table 1.

Example 11

Pulverized particles (aggregate particles) were obtained similarly to Example 3 except that the vinyl chloride-based resin latex obtained in Manufacture Example 5 was used, and the heat treatment was performed at 90° C. The mean volume particle diameter of the obtained pulverized particles (aggregate particles) and the percentage of particles having a particle diameter of 10 to 60 μm are as shown in Table 2.

Example 12

Pulverized particles (aggregate particles) were obtained similarly to Example 3 except that the vinyl chloride-based resin latex obtained in Manufacture Example 6 was used, and the heat treatment was performed at 85° C. The mean volume particle diameter of the obtained pulverized particles (aggregate particles) and the percentage of particles having a particle diameter of 10 to 60 μm are as shown in Table 2.

Example 13

Pulverized particles (aggregate particles) were obtained similarly to Example 3 except that phosphoric acid (10% phosphoric acid aqueous solution) was used as the coagulant instead of sulfuric acid (10% sulfuric acid aqueous solution). The mean volume particle diameter of the obtained pulverized particles (aggregate particles) and the percentage of particles having a particle diameter of 10 to 60 μm are as shown in Table 2.

Example 14

Pulverized particles (aggregate particles) were obtained similarly to Example 3 except that nitric acid (10% nitric acid aqueous solution) was used as the coagulant instead of sulfuric acid (10% sulfuric acid aqueous solution). The mean volume particle diameter of the obtained pulverized particles (aggregate particles) and the percentage of particles having a particle diameter of 10 to 60 μm are as shown in Table 2.

Example 15

Pulverized particles (aggregate particles) were obtained similarly to Example 3 except that the vinyl chloride-based resin latex obtained in Manufacture Example 7 was used. The mean volume particle diameter of the obtained pulverized particles (aggregate particles) and the percentage of particles having a particle diameter of 10 to 60 μm are as shown in Table 2.

Example 16

The temperature of the vinyl chloride-based resin latex (15.5 kg) obtained in Manufacture Example 1 was adjusted to 40° C. Then, sulfuric acid was used as the coagulant. A 10% sulfuric acid aqueous solution was added to the vinyl chloride-based resin latex for one minute while being stirred so that the addition amount of sulfuric acid would be 1 weight part with respect to 100 weight parts of the polymer solid in the vinyl chloride-based resin latex. The obtained mixture of the vinyl chloride-based resin latex and the coagulant was stirred and mixed for 30 minutes under a strong shear force of 5 kW/m$^3$ or more, so as to obtain a coagulated latex of vinyl chloride-based resin. The moisture contained in the obtained coagulated latex was removed with a paper towel, and the concentration of the polymer solid in the coagulated latex of vinyl chloride-based resin was adjusted to 47.5%. Pulverized particles (aggregate particles) were obtained similarly to Example 3 except that the coagulated latex of vinyl chloride-based resin having the concentration of the polymer solid of 47.5% obtained above was used. The mean volume particle diameter of the obtained pulverized particles (aggregate particles) and the percentage of particles having a particle diameter of 10 to 60 μm are as shown in Table 2.

Example 17

Pulverized particles (aggregate particles) were obtained similarly to Example 3 except that pure water was added to 15.5 kg of the vinyl chloride-based resin latex obtained in Manufacture Example 1 so that the concentration of the polymer solid in the latex after coagulation would be 27.5%. The mean volume particle diameter of the obtained pulverized particles (aggregate particles) and the percentage of particles having a particle diameter of 10 to 60 μm are as shown in Table 2.

Example 18

Pulverized particles (aggregate particles) were obtained similarly to Example 3 except that sulfuric acid (10% aqueous solution) and calcium chloride (10% aqueous solution) were used as the coagulant, and the addition amounts of sulfuric acid and calcium chloride were adjusted to be 0.6 parts and 0.4 parts, respectively, with respect to 100 parts of the polymer solid in the vinyl chloride-based resin latex. The mean volume particle diameter of the obtained pulverized particles (aggregate particles) and the percentage of particles having a particle diameter of 10 to 60 μm are as shown in Table 2.

Example 19

Pulverized particles (aggregate particles) were obtained similarly to Example 3 except that sulfuric acid (10% aqueous solution) and polyvinyl alcohol ("GOHSENOL KH17" manufactured by Nippon Synthetic Chemical Industry Co., Ltd., 3% aqueous solution) were used as the coagulant, and the addition amounts of sulfuric acid and polyvinyl alcohol were adjusted to be 0.9 parts and 0.1 parts, respectively, with respect to 100 parts of the polymer solid in the vinyl chloride-based resin latex. The mean volume particle diameter of the obtained pulverized particles (aggregate particles) and the percentage of particles having a particle diameter of 10 to 60 μm are as shown in Table 2.

Example 20

Pulverized particles (aggregate particles) were obtained similarly to Example 3 except that the stirring after addition of coagulant at the time of preparing the coagulated latex was performed under a weak shear force of less than 2 kW/m$^3$. The mean volume particle diameter of the obtained pulverized particles (aggregate particles) and the percentage of particles having a particle diameter of 10 to 60 μm are as shown in Table 2.

Comparative Example 1

Pulverized particles (aggregate particles) were obtained similarly to Example 1 except that the heat treatment temperature was set at 120° C. The mean volume particle diameter of the obtained pulverized particles (aggregate particles) and the percentage of particles having a particle diameter of 10 to 60 μm are as shown in Table 3.

Comparative Example 2

Pulverized particles (aggregate particles) were obtained similarly to Example 2 except that the heat treatment temperature was set at 120° C. The mean volume particle diameter of the obtained pulverized particles (aggregate particles) and the percentage of particles having a particle diameter of 10 to 60 μm are as shown in Table 3.

Comparative Example 3

Pulverized particles (aggregate particles) were obtained similarly to Example 3 except that the heat treatment temperature was set at 120° C. The mean volume particle diameter of the obtained pulverized particles (aggregate particles) and the percentage of particles having a particle diameter of 10 to 60 μm are as shown in Table 3.

Comparative Example 4

Pulverized particles (aggregate particles) were obtained similarly to Example 3 except that the heat treatment temperature was set at 75° C. The mean volume particle diameter of the obtained pulverized particles (aggregate particles) and the percentage of particles having a particle diameter of 10 to 60 μm are as shown in Table 3.

Comparative Example 5

Pulverized particles (aggregate particles) were obtained similarly to Example 3 except that at the stage where the inner temperature of the second mixer 11 became 80° C. or lower, the slurry containing the aggregate particles was adjusted to pH 3 using 5% sodium hydroxide aqueous solution, and the washing after dewatering through filtration was performed with pure water that had been adjusted to pH 3 using sulfuric acid. Incidentally, before the pH adjustment, the pH of the slurry containing the aggregate particles was 2.6. The mean volume particle diameter of the obtained pulverized particles (aggregate particles) and the percentage of particles having a particle diameter of 10 to 60 μm are as shown in Table 3.

Comparative Example 6

Pulverized particles (aggregate particles) were obtained similarly to Example 3 except that at the stage where the inner temperature of the second mixer 11 became 80° C. or lower, the slurry containing the aggregate particles was adjusted to pH 12 using 5% sodium hydroxide aqueous solution, and the washing after dewatering through filtration was performed with pure water that had been adjusted to pH 12 using sodium hydroxide. Incidentally, before the pH adjustment, the pH of the slurry containing the aggregate particles was 2.6. The mean volume particle diameter of the obtained pulverized particles (aggregate particles) and the percentage of particles having a particle diameter of 10 to 60 μm are as shown in Table 3.

Comparative Example 7

Pulverized particles (aggregate particles) were obtained similarly to Example 3 except that sulfuric acid (10% aqueous solution) and polyvinyl alcohol ("GOHSENOL KH17" manufactured by Nippon Synthetic Chemical Industry Co., Ltd., 3% aqueous solution) were used as the coagulant, and the addition amounts of sulfuric acid and polyvinyl alcohol were adjusted to be 0.4 parts and 0.6 parts, respectively, with respect to 100 parts of the polymer solid in the vinyl chloride-based resin latex. The mean volume particle diameter of the obtained pulverized particles (aggregate particles) and the percentage of particles having a particle diameter of 10 to 60 μm are as shown in Table 3.

Comparative Example 8

Pulverized particles (aggregate particles) were obtained similarly to Example 3 except that calcium chloride (10% aqueous solution) was used as the coagulant instead of sulfuric acid (10% sulfuric acid aqueous solution). The mean volume particle diameter of the obtained pulverized particles (aggregate particles) and the percentage of particles having a particle diameter of 10 to 60 μm are as shown in Table 3.

Comparative Example 9

Pulverized particles (aggregate particles) were obtained similarly to Example 3 except that pure water was added to 15.5 kg of the vinyl chloride-based resin latex obtained in Manufacture Example 1 so that the concentration of the polymer solid in the latex after coagulation would be 20%. The mean volume particle diameter of the obtained pulverized particles (aggregate particles) and the percentage of particles having a particle diameter of 10 to 60 μm are as shown in Table 3.

Comparative Example 10

Pulverized particles (aggregate particles) were obtained similarly to Example 3 except that the pulverization process was performed so that the percentage of particles having a particle diameter of 10 to 60 μm in the vinyl chloride-based resin aggregate particles would be less than 50 vol %. The mean volume particle diameter of the obtained pulverized particles (aggregate particles) and the percentage of particles having a particle diameter of 10 to 60 μm are as shown in Table 3.

Comparative Example 11

Pulverized particles (aggregate particles) were obtained similarly to Example 3 except that sodium sulfate (10% aqueous solution) and polyvinyl alcohol ("GOHSENOL KH17" manufactured by Nippon Synthetic Chemical Industry Co., Ltd., 3% aqueous solution) were used as the coagulant, and the addition amounts of sodium sulfate and polyvinyl alcohol were adjusted to be 1 part and 0.5 parts, respectively, with respect to 100 parts of the polymer solid in the vinyl chloride-based resin latex. The mean volume particle diameter of the obtained pulverized particles (aggregate particles) and the percentage of particles having a particle diameter of 10 to 60 μm are as shown in Table 3.

The moisture absorption coefficient, apparent density, void size and percentage of particles having a particle diameter of 1.0 μm or less after ultrasonic treatment of the vinyl chloride-based resin aggregate particles (pulverized particles) obtained in Examples and Comparative Examples as well as the heat thickening degree, non-infiltrating property and sagging property of the plastisols containing the vinyl chloride-based resin aggregate particles obtained in Examples and Comparative Examples and the sagging property of the water-added plastisols were measured in the above-mentioned manner, and the results are shown in Tables 1-3 below. Tables 1-3 also indicate the other conditions in the Examples and Comparative Examples.

TABLE 1

| | Examples | | | | | | | | | |
|---|---|---|---|---|---|---|---|---|---|---|
| | 1 | 2 | 3 | 4 | 5 | 6 | 7 | 8 | 9 | 10 |
| Vinyl chloride content in polymer composition (wt %) | 100 | 100 | 100 | 100 | 100 | 100 | 100 | 100 | 100 | 95 |
| Emulsifier | Ammonium myristate | | | | | | | Potassium stearate | Potassium myristate | Ammonium myristate |
| Concentration of polymer solid in coagulated latex (wt %) | 30 | 40 | 40 | 40 | 40 | 40 | 40 | 40 | 40 | 40 |
| Coagulant | Hydrochloric acid | Hydrochloric acid | Sulfuric acid | Sulfuric acid | Sulfuric acid | Sulfuric acid | Sulfuric acid | Sulfuric acid | Sulfuric acid | Sulfuric acid |
| Inorganic acid content in coagulant (wt %) | 100 | 100 | 100 | 100 | 100 | 100 | 100 | 100 | 100 | 100 |
| Shear force at coagulation operation | Strong | Strong | Strong | Strong | Strong | Strong | Strong | Strong | Strong | Strong |
| Heating medium at heat treatment | Water vapor | | | | Water bath and water vapor | | | | | |
| Heat treatment temperature (° C.) | 105 | 105 | 100 | 85 | 110 | 100 | 100 | 100 | 100 | 95 |
| pH after adjustment | 7 | 7 | 7 | 7 | 7 | 5 | 10 | 7 | 7 | 7 |
| Mean volume particle diameter of aggregate particles after pulverization (μm) | 25 | 27 | 17 | 15 | 29 | 18 | 17 | 18 | 17 | 28 |
| Percentage of particles having a particle diameter of 10 to 60 μm (vol %) | 73 | 66 | 77 | 52 | 78 | 67 | 58 | 68 | 70 | 62 |
| Moisture absorption coefficient (wt %) | 0.3 | 0.3 | 0.4 | 0.3 | 0.3 | 0.6 | 0.7 | 0.2 | 0.3 | 0.4 |
| Apparent density (g/ml) | 0.31 | 0.30 | 0.27 | 0.21 | 0.30 | 0.27 | 0.25 | 0.28 | 0.27 | 0.31 |
| $\eta 70/\eta 40$ value | 105 | 84 | 67 | 15 | 106 | 71 | 64 | 84 | 100 | 102 |
| Non-infiltrating property of plastisol | A | A | A | B | A | A | A | A | A | A |
| Sagging property of plastisol | A | A | A | A | A | A | A | A | A | A |
| Sagging property of water-added plastisol | A | A | A | A | A | B | B | A | A | A |
| Number of voids having a void size of 1 μm or more | 0 | 0 | 0 | 0 | 0 | 0 | 0 | 0 | 0 | 0 |
| Percentage of particles having a particle diameter of 1.0 μm or less after ultrasonic treatment (vol %) | 0 | 0 | 0 | 0.8 | 0 | 0 | 0 | 0 | 0 | 0 |

TABLE 2

| | Examples | | | | | | | | | |
|---|---|---|---|---|---|---|---|---|---|---|
| | 11 | 12 | 13 | 14 | 15 | 16 | 17 | 18 | 19 | 20 |
| Vinyl chloride content in polymer composition (wt %) | 90 | 85 | 100 | 100 | 100 | 100 | 100 | 100 | 100 | 100 |
| Emulsifier | | Ammonium myristate | | | SDS | | | Ammonium myristate | | |
| Concentration of polymer solid in coagulated latex (wt %) | 40 | 40 | 40 | 40 | 40 | 47.5 | 27.5 | 40 | 40 | 40 |
| Coagulant | Sulfuric acid | Sulfuric acid | Phosphoric acid | nitric acid | Sulfuric acid | Sulfuric acid | Sulfuric acid | Sulfuric acid/ Calcium chloride | Sulfuric acid/ PVA | Sulfuric acid |
| Inorganic acid content in coagulant (wt %) | 100 | 100 | 100 | 100 | 100 | 100 | 100 | 60 | 90 | 100 |
| Shear force at coagulation operation | Strong | Strong | Strong | Strong | Strong | Strong | Strong | Strong | Strong | Weak |
| Heating medium at heat treatment | | | | | Water bath and water vapor | | | | | |
| Heat treatment temperature (° C.) | 90 | 85 | 100 | 100 | 100 | 100 | 100 | 100 | 100 | 100 |
| pH after adjustment | 7 | 7 | 7 | 7 | 7 | 7 | 7 | 7 | 7 | 7 |
| Mean volume particle diameter of aggregate particles after pulverization (μm) | 25 | 26 | 18 | 17 | 15 | 20 | 17 | 21 | 20 | 15 |
| Percentage of particles having a particle diameter of 10 to 60 μm (vol %) | 70 | 69 | 65 | 71 | 50 | 73 | 68 | 71 | 68 | 54 |
| Moisture absorption coefficient (wt %) | 0.3 | 0.4 | 0.4 | 0.3 | 0.5 | 0.3 | 0.5 | 0.6 | 0.7 | 0.5 |
| Apparent density (g/ml) | 0.26 | 0.3 | 0.25 | 0.23 | 0.22 | 0.34 | 0.21 | 0.31 | 0.26 | 0.29 |
| η70/η40 value | 86 | 77 | 78 | 36 | 12 | 45 | 27 | 205 | 47 | 160 |
| Non-infiltrating property of plastisol | A | A | A | A | B | B | A | B | A | B |
| Sagging property of plastisol | A | A | A | A | A | A | B | B | A | B |
| Sagging property of water-added plastisol | A | A | A | A | A | A | B | B | B | B |
| Number of voids having a void size of 1 μm or more | 0 | 0 | 0 | 0 | 1.5 | 0 | 0.4 | 1.4 | 3.6 | 0.8 |
| Percentage of particles having a particle diameter of 1.0 μm or less after ultrasonic treatment (vol %) | 0 | 0 | 0 | 0 | 2.2 | 0 | 2.5 | 1.9 | 1.3 | 0.6 |

TABLE 3

| | Comparative Examples | | | | | | | | | | |
|---|---|---|---|---|---|---|---|---|---|---|---|
| | 1 | 2 | 3 | 4 | 5 | 6 | 7 | 8 | 9 | 10 | 11 |
| Vinyl chloride content in polymer composition (wt %) | 100 | 100 | 100 | 100 | 100 | 100 | 100 | 100 | 100 | 100 | 100 |
| Emulsifier | | | | | | Ammonium myristate | | | | | |
| Concentration of polymer solid in coagulated latex (wt %) | 30 | 40 | 40 | 40 | 40 | 40 | 40 | 40 | 20 | 40 | 40 |
| Coagulant | Hydrochloric acid | Hydrochloric acid | Sulfuric acid | Sulfuric acid | Sulfuric acid | Sulfuric acid | Sulfuric acid/ PVA | Calcium chloride | Sulfuric acid | Sulfuric acid | Sodium sulfate/ PVA |
| Inorganic acid content in coagulant (wt %) | 100 | 100 | 100 | 100 | 100 | 100 | 40 | 0 | 100 | 100 | 0 |
| Shear force at coagulation operation | Strong | Strong | Strong | Strong | Strong | Strong | Strong | Strong | Strong | Strong | Strong |
| Heating medium at heat treatment | Water vapor | | | | | Water bath and water vapor | | | | | |
| Heat treatment temperature (° C.) | 120 | 120 | 120 | 75 | 100 | 100 | 100 | 100 | 100 | 100 | 100 |
| pH after adjustment | 7 | 7 | 7 | 7 | 3 | 12 | 9 | 7 | 7 | 7 | 7 |
| Mean volume particle diameter of aggregate particles after pulverization (μm) | 36 | 42 | 32 | 17 | 20 | 19 | 19 | 28 | 16 | 19 | 25 |
| Percentage of particles having a particle diameter of 10 to 60 μm (vol %) | 76 | 79 | 64 | 56 | 45 | 61 | 64 | 65 | 52 | 46 | 72 |
| Moisture absorption coefficient (wt %) | 0.2 | 0.2 | 0.2 | 0.8 | 1.8 | 2.1 | 1.8 | 0.8 | 0.4 | 0.3 | 1.9 |
| Apparent density (g/ml) | 0.37 | 0.38 | 0.36 | 0.16 | 0.26 | 0.25 | 0.24 | 0.31 | 0.18 | 0.24 | 0.22 |
| η70/η40 value | 1520 | 1120 | 1760 | 1.5 | 100 | 48 | 15 | 1280 | 2.0 | 56 | 4.5 |
| Non-infiltrating property | B | B | B | C | A | A | A | B | C | C | C |
| Sagging property of plastisol | C | C | C | C | A | A | A | C | C | B | A |
| Sagging property of water-added plastisol | C | C | C | C | C | C | C | C | C | B | C |
| Number of voids having a void size of 1 μm or more | 0.3 | 0 | 0 | 0.7 | 0 | 0 | 5.0 or more | 5.0 or more | 5.0 or more | 0 | 5.0 or more |
| Percentage of particles having a particle diameter of 1.0 μm or less after ultrasonic treatment (vol %) | 0 | 0 | 0 | 46 | 0 | 3.4 | 2.7 | 12 | 6.1 | 0 | 29 |

As can be seen from Tables 1 and 2, the vinyl chloride-based resin aggregate particles of Examples 1-20 had a mean volume particle diameter of 10 to 60 μm, and the percentage of particles having a particle diameter of 10 to 60 μm was at least 50 vol %.

Further, the moisture absorption coefficient of the vinyl chloride-based resin aggregate particles of Examples 1-20 was 1.5 wt % or less, and the η70/η40 was 3 to 1000.

Further, the apparent density of the vinyl chloride-based resin aggregate particles of Examples 1-20 was in a range of 0.21 to 0.34 g/ml, and the number of voids having a void size of 1.0 μm or more per one aggregate particle was less than 5.0. Moreover, when the vinyl chloride-based resin aggregate particles of Examples 1-20 were irradiated with 28-kHz ultrasonic waves at 25° C. for 12 minutes, i.e., subjected to the ultrasonic treatment, the percentage of particles having a particle diameter of 1.0 μm or less after ultrasonic treatment was less than 3.0 vol %. Particularly, in Examples 1-14, 16, 17 and 20 where only inorganic acids were used as the coagulant and fatty acid salts were used as the emulsifier, the number of voids having a void size of 1.0 μm or more per one aggregate particle was 1.0 or less, which is preferable. Among Examples 1-14, 16, 17 and 20, in Examples 1-14, 16 and 20 where the concentration of the polymer solid of the coagulated latex was 30 wt % or more, the number of voids having a void size of 1.0 μm or more per one aggregate particle was 1.0 or less, and the percentage of particles having a particle diameter of 1.0 μm or less after ultrasonic treatment was 1.0 vol % or less, which is more preferable. Among Examples 1-14, 16 and 20, in Examples 1-14 and 16 where the shear force at the coagulation operation was strong, the number of voids having a void size of 1.0 μm or more per one aggregate particle was 0, and the percentage of particles having a particle diameter of 1.0 μm or less after ultrasonic treatment was 1.0 vol % or less, which is further preferable.

Moreover, the plastisols obtained using the vinyl chloride-based resin aggregate particles of Examples 1-20 exhibited favorable non-infiltrating property and favorable sagging property. Further, the water-added plastisols obtained using the vinyl chloride-based resin aggregate particles of Examples 1-20 also exhibited favorable sagging property.

Meanwhile, as can be seen from Table 3, in Comparative Examples 1-3 where the heat treatment was performed at a temperature higher than the predetermined temperature, the η70/η40 of the plastisols containing the vinyl chloride-based resin aggregate particles exceeded 1000, and the evaluations of the sagging property of the plastisols and the sagging property of the water-added plastisols were all C. In Comparative Example 4 where the heat treatment was performed at a temperature lower than the predetermined temperature, the η70/η40 of the plastisol containing the vinyl chloride-based resin aggregate particles was less than 3, and the evaluations of the non-infiltrating property and sagging property of the plastisol and the sagging property of the water-added plastisol were all C. In Comparative Example 5 where the pH of the slurry containing the vinyl chloride-based resin aggregate particles after adjustment was less than 4, the percentage of particles having a particle diameter of 10 to 60 μm in the vinyl chloride-based resin aggregate particles was less than 50 vol %, the moisture absorption coefficient exceeded 1.5 wt %, and the evaluation of the sagging property of the water-added plastisol was C. In Comparative Example 6 where the pH of the slurry containing the vinyl chloride-based resin aggregate particles after adjustment exceeded 11, the moisture absorption coefficient of the vinyl chloride-based resin aggregate particles exceeded 1.5 wt %, and the evaluation of the sagging property of the water-added plastisol was C. In Comparative Example 7 where the content of the inorganic acid in the coagulant was less than 50 wt %, the moisture absorption coefficient of the vinyl chloride-based resin aggregate particles exceeded 1.5 wt %, and the evaluation of the sagging property of the water-added plastisol was C. In Comparative Example 8 where the coagulant did not contain inorganic acid, the η70/η40 of the plastisol containing the vinyl chloride-based resin aggregate particles exceeded 1000, and the evaluations of the sagging property of the plastisol and the sagging property of the water-added plastisol were both C. In Comparative Example 9 where the concentration of the polymer solid in the coagulated latex of vinyl chloride-based resin was less than 22 wt %, the η70/η40 of the plastisol containing the vinyl chloride-based resin aggregate particles was less than 3, and the evaluations of the non-infiltrating property and sagging property of the plastisol and the sagging property of the water-added plastisol were all C. In Comparative Example 10 where the percentage of particles having a particle diameter of 10 to 60 μm in the vinyl chloride-based resin aggregate particles was less than 50 vol %, the evaluation of the non-infiltrating property of the plastisol was C.

Further, as can be seen from Table 3, in Comparative Examples 1-3 where the heat treatment was performed at a temperature higher than the predetermined temperature, the apparent density of the vinyl chloride-based resin aggregate particles exceeded 0.34 g/ml, and the evaluations of the sagging property of the plastisols and the sagging property of the water-added plastisols were all C. In the vinyl chloride-based resin aggregate particles of Comparative Example 4 where the heat treatment was performed at the temperature lower than the predetermined temperature, the percentage of particles having a particle diameter of 1.0 μm or less after ultrasonic treatment was far beyond 3.0 vol %, and the evaluations of the non-infiltrating property and sagging property of the plastisol and the sagging property of the water-added plastisol were all C. In Comparative Example 5 where the pH of the slurry containing the vinyl chloride-based resin aggregate particles after adjustment was less than 4, the percentage of particles having a particle diameter of 10 to 60 μm in the vinyl chloride-based resin aggregate particles was less than 50 vol %, and the evaluation of the sagging property of the water-added plastisol was C. In Comparative Example 6 where the pH of the slurry containing the vinyl chloride-based resin aggregate particles after adjustment exceeded 11, the percentage of particles having a particle diameter of 1.0 μm or less after ultrasonic treatment exceeded 3.0 vol %, and the evaluation of the sagging property of the water-added plastisol was C. In Comparative Example 7 where the content of the inorganic acid in the coagulant was less than 50 wt %, the number of voids having a void size of 1.0 μm or more per one aggregate particle was 5.0 or more, and the evaluation of the sagging property of the water-added plastisol was C. In Comparative Example 8 where the coagulant contained an inorganic salt, not an inorganic acid, the number of voids having a void size of 1.0 μm or more per one aggregate particle was 5.0 or more, the percentage of particles having a particle diameter of 1.0 μm or less after ultrasonic treatment exceeded 3.0 vol %, and the evaluations of the sagging property of the plastisol and the sagging property of the water-added plastisol were both C. In Comparative Example 9 where the concentration of the polymer solid in the coagulated latex of vinyl chloride-based resin was less than 22 wt %, the number of voids having a void size of 1.0 μm or more per one aggregate particle was 5.0 or more, the percentage of particles having a particle diameter of 1.0 μm or less after ultrasonic treatment exceeded 3.0 vol %, and the evaluations of the non-infiltrating property and sagging property of the plastisol and the sagging property of the water-added plastisol were all C. In Comparative Example 11 where the coagulant contained an inorganic salt and PVA, not an inorganic acid, the number of voids having a void size of 1.0 μm or more per one aggregate particle was 5.0 or more, the percentage of particles having a particle diameter of 1.0 μm or less after ultrasonic treatment exceeded 3.0 vol %, and the evaluations of the non-infiltrating property and the sagging property of the water-added plastisol were both C.

FIGS. 4 and 5 are photographs (3000× magnification) of the scanning electron microscope respectively showing the fractured surfaces of the vinyl chloride-based resin aggregate particles in Example 9 and Comparative Example 8. As can be seen from FIGS. 4 and 5, there was no void in the vinyl chloride-based resin aggregate particle of the Example, whereas micron-size voids were present in the vinyl chloride-based resin aggregate particle of the Comparative Example. Further, FIGS. 7 and 8 respectively show the particle size distributions before and after ultrasonic treatment of the vinyl chloride-based resin aggregate particles in Example 9 and Comparative Example 8. In FIG. 7, since the particle size distribution curve before ultrasonic treatment 30 and the particle size distribution curve after ultrasonic treatment 31 almost overlap with each other, it can be understood that the vinyl chloride-based resin aggregate particles of the Example are superior in resistance to disintegration by ultrasonic waves. Meanwhile, as can be seen from FIG. 8, in the vinyl chloride-based resin aggregate particles of the Comparative Example, the particle size distribution curve before ultrasonic treatment 40 and the particle size distribution curve after ultrasonic treatment 41 do not overlap with each other, and the vinyl chloride-based resin aggregate particles disintegrated by the ultrasonic treatment, which resulted in generation of particles having a particle diameter of 1.0 μm or less.

INDUSTRIAL APPLICABILITY

By coating a sheet, a glove, a bag and the like with a vinyl chloride-based resin using the vinyl chloride-based resin aggregate particles of the present invention, the sheet, the glove, the bag and the like coated with the vinyl chloride-based resin that have high mechanical strength and excellent wear resistance, chemical resistance, and oil resistance and that can be used in various field such as fisheries, agriculture, mining and the like can be provided.

DESCRIPTION OF REFERENCE NUMERALS

10 First mixer
11 Second mixer
12 Pump
13 Vapor mixer
14, 22 Water vapor
15, 16, 25 Stirrer
20 Mixer
21 50 L tank
23 Hot water
30, 31, 40, 41 Particle size distribution curve
51 Vinyl chloride-based resin latex particles
52 Coagulated latex particles of vinyl chloride-based resin
53 Vinyl chloride-based resin aggregate particles

The invention claimed is:

1. Vinyl chloride-based resin aggregate particles, wherein the vinyl chloride-based resin aggregate particles have a mean volume particle diameter of 10 to 60 μm, and the percentage of particles having a particle diameter of 10 to 60 μm is at least 50% by volume, a moisture absorption coefficient of the vinyl chloride-based resin aggregate particles is 1.5% by weight or less when being retained for 24 hours under conditions of 30° C. and a relative humidity of 97.0±0.4%, and a plastisol comprising 100 parts by weight of the vinyl chloride-based resin aggregate particles and 160 parts by weight of di-2-ethylhexyl phthalate satisfies a relationship of $3 \leq \eta 70/\eta 40 \leq 1000$ where $\eta 40$ is a viscosity at a shear rate of $1\ s^{-1}$ of a plastisol retained at 40° C. for 10 minutes and $\eta 70$ is a viscosity at a shear rate of $1\ s^{-1}$ of a plastisol that has been warmed from 40° C. at 10° C./min. and retained at 70° C. for 3 minutes.

2. The vinyl chloride-based resin aggregate particles according to claim 1, wherein an apparent density of the vinyl chloride-based resin aggregate particles is in a range of 0.21 to 0.34 g/ml.

3. Vinyl chloride-based resin aggregate particles, wherein the vinyl chloride-based resin aggregate particles have a mean volume particle diameter of 10 to 60 μm, and the percentage of particles having a particle diameter of 10 to 60 μm is at least 50% by volume, an apparent density of the vinyl chloride-based resin aggregate particles is in a range of 0.21 to 0.34 g/ml, the number of voids having a void size of 1.0 μm or more per one aggregate particle in the vinyl chloride-based resin aggregate particles is less than 5.0, and when the vinyl chloride-based resin aggregate particles are subjected to an ultrasonic treatment that is irradiation with 28-kHz ultrasonic waves at 25° C. for 12 minutes, the percentage of particles having a particle diameter of 1.0 μm or less after the ultrasonic treatment is less than 3.0% by volume.

4. The vinyl chloride-based resin aggregate particles according to claim 3, wherein a moisture absorption coefficient of the vinyl chloride-based resin aggregate particles is 1.5% by weight or less when being retained for 24 hours under conditions of 30° C. and a relative humidity of 97.0±0.4%.

5. The vinyl chloride-based resin aggregate particles according to claim 3, wherein a plastisol comprising 100 parts by weight of the vinyl chloride-based resin aggregate particles and 160 parts by weight of di-2-ethylhexyl phthalate satisfies a relationship of $3 \leq \eta 70/\eta 40 \leq 1000$ where $\eta 40$ is a viscosity at a shear rate of $1\ s^{-1}$ of a plastisol retained at 40° C. for 10 minutes and $\eta 70$ is a viscosity at a shear rate of $1\ s^{-1}$ of a plastisol that has been warmed from 40° C. at 10° C./min. and retained at 70° C. for 3 minutes.

6. The vinyl chloride-based resin aggregate particles according to claim 1, wherein a moisture absorption coefficient of the vinyl chloride-based resin aggregate particles is 1.0% by weight or less when being retained for 24 hours under conditions of 30° C. and a relative humidity of 97.0±0.4%.

7. The vinyl chloride-based resin aggregate particles according to claim 1, wherein the $\eta 70/\eta 40$ is in a range of 5 to 110.

8. A method for producing the vinyl chloride-based resin aggregate particles according to claim 1, comprising:

adding for coagulation a coagulant that contains 50% by weight or more of an inorganic acid to a vinyl chloride-based resin latex so as to form a coagulated latex of vinyl chloride-based resin that contains a polymer solid at a concentration of 22% by weight or more;

heat-treating the coagulated latex of vinyl chloride-based resin at a temperature ranging from Tg or higher to Tg+35° C. or lower so as to form a slurry containing vinyl chloride-based resin aggregate particles, where Tg is a glass transition temperature of the vinyl chloride-based resin;

adjusting a pH of the slurry containing vinyl chloride-based resin aggregate particles in a range of 4 to 11; and dewatering and drying the slurry containing vinyl chloride-based resin aggregate particles after the pH adjustment, followed by pulverization and/or classification, thereby obtaining vinyl chloride-based resin aggregate particles that have a mean volume particle diameter of 10 to 60 μm and whose percentage of particles having a particle diameter of 10 to 60 μm is at least 50% by volume.

9. The method for producing the vinyl chloride-based resin aggregate particles according to claim 8, wherein the use of the coagulant that contains 50% by weight or more of an inorganic acid and the coagulated latex of vinyl chloride-based resin that contains a polymer solid at a concentration of 22% by weight or more provides vinyl chloride-based resin aggregate particles whose number of voids having a void size of 1.0 μm or more per one aggregate particle is less than 5.0.

10. The method for producing the vinyl chloride-based resin aggregate particles according to claim 8, wherein the heat treatment is performed by mixing the coagulated latex of vinyl chloride-based resin with at least one heating medium selected from the group consisting of water vapor and water bath.

11. The method for producing the vinyl chloride-based resin aggregate particles according to claim 8, wherein the vinyl chloride-based resin is a vinyl chloride resin.

12. The method for producing the vinyl chloride-based resin aggregate particles according to claim 8, wherein the heat treatment is performed at a temperature of 80 to 115° C.

13. The method for producing the vinyl chloride-based resin aggregate particles according to claim 8, wherein a temperature at the time of adding for coagulation the coagulant to the vinyl chloride-based resin latex is in a range of 5° C. or higher to Tg−15° C. or lower.

14. The method for producing the vinyl chloride-based resin aggregate particles according to claim 8, wherein the coagulated latex of vinyl chloride-based resin contains a polymer solid at a concentration of 25 to 50% by weight.

15. The method for producing the vinyl chloride-based resin aggregate particles according to claim 8, wherein
the vinyl chloride-based resin latex is obtained by adding for polymerization a polymerization initiator and an emulsifier to a vinyl chloride monomer or a mixture of a vinyl chloride monomer and a monomer that is co-polymerizable with the vinyl chloride monomer, and
the emulsifier is a fatty acid salt.

16. The method for producing the vinyl chloride-based resin aggregate particles according to claim 15, wherein the use of a fatty acid salt as the emulsifier provides vinyl chloride-based resin aggregate particles whose percentage of particles having a particle diameter of 1.0 μm or less after an ultrasonic treatment is less than 3.0% by volume, where the ultrasonic treatment is irradiation with 28-kHz ultrasonic waves at 25° C. for 12 minutes.

17. The method for producing the vinyl chloride-based resin aggregate particles according to claim 8, wherein the coagulant is composed of an inorganic acid only.

18. The method for producing the vinyl chloride-based resin aggregate particles according to claim 8, wherein the inorganic acid is at least one selected from the group consisting of sulfuric acid and hydrochloric acid.

19. A glove coated with a vinyl chloride-based resin,
wherein the glove is coated with the vinyl chloride-based resin by applying a plastisol on a fabric surface of the glove and subsequently heating for gelation, and
the plastisol contains the vinyl chloride-based resin aggregate particles according to claim 1.

20. The vinyl chloride-based resin aggregate particles according to claim 1, wherein the vinyl chloride-based resin aggregate particles are aggregates of coagulated latex particles of vinyl chloride-based resin.

\* \* \* \* \*